US012804267B2

(12) United States Patent
Kaneko

(10) Patent No.: US 12,804,267 B2
(45) Date of Patent: Nov. 17, 2026

(54) CONTROL APPARATUS, METHOD, AND STORAGE MEDIUM TO POSITION IMAGE CAPTURE DIRECTION

(71) Applicant: CANON KABUSHIKI KAISHA, Tokyo (JP)

(72) Inventor: Seigo Kaneko, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 19/067,078

(22) Filed: Feb. 28, 2025

(65) Prior Publication Data

US 2025/0294256 A1 Sep. 18, 2025

(30) Foreign Application Priority Data

Mar. 12, 2024 (JP) ................................ 2024-038131

(51) Int. Cl.
*H04N 23/695* (2023.01)
*G06T 3/60* (2024.01)

(52) U.S. Cl.
CPC ............. *H04N 23/695* (2023.01); *G06T 3/60* (2013.01)

(58) Field of Classification Search
CPC ...... H04N 23/695; H04N 23/62; H04N 23/69; H04N 23/90; G06T 3/60
USPC .................................................... 348/211.11
See application file for complete search history.

(56) References Cited

U.S. PATENT DOCUMENTS

| | | | | |
|---|---|---|---|---|
| 6,037,936 A * | 3/2000 | Ellenby | G06T 15/10 | 715/764 |
| 6,597,393 B2 * | 7/2003 | Kato | G08B 13/19645 | 348/211.6 |
| 6,965,394 B2 * | 11/2005 | Gutta | H04N 23/631 | 348/14.05 |
| 7,717,629 B2 * | 5/2010 | Kenoyer | F16M 11/10 | 396/428 |
| 7,811,008 B2 * | 10/2010 | Dumm | F16M 11/2014 | 396/419 |
| 8,485,740 B1 * | 7/2013 | Chapman | F16M 11/2071 | 396/428 |
| 8,638,371 B2 * | 1/2014 | Laberge | H04N 23/631 | 348/211.8 |
| 9,635,224 B2 * | 4/2017 | Bart | H04N 23/69 | |
| 9,977,312 B1 * | 5/2018 | Lefever | H04N 23/50 | |

(Continued)

FOREIGN PATENT DOCUMENTS

JP 2007114503 A 5/2007

*Primary Examiner* — Usman A Khan
(74) *Attorney, Agent, or Firm* — Canon U.S.A., Inc. IP Division

(57) ABSTRACT

A control apparatus includes one or more memories storing instructions and one or more processors executing the instructions to obtain a movement direction instructed by a user with respect to an image captured to be displayed by an image capturing unit, obtain at least one of a rotation angle by a rotation of the image capturing unit or an image capturing element of the image capturing unit about an optical axis of an imaging optical system or a rotation angle by a rotation of the displayed image about a center of the image, and control a first drive unit that moves a shooting direction of the image capturing unit in a first direction and a second drive unit that moves the shooting direction of the image capturing unit in a second direction that is different from the first direction.

14 Claims, 23 Drawing Sheets

(56) References Cited

U.S. PATENT DOCUMENTS

| | | | | |
|---|---|---|---|---|
| 10,104,281 | B2 * | 10/2018 | Oshima | H04M 1/72412 |
| 2008/0316368 | A1 * | 12/2008 | Fritsch | H04N 5/272 348/E5.022 |
| 2010/0066831 | A1 * | 3/2010 | Origuchi | H04N 1/00251 348/347 |
| 2012/0007999 | A1 * | 1/2012 | Horii | H04N 23/698 348/E5.042 |
| 2013/0155268 | A1 * | 6/2013 | Mock | H04N 7/15 348/211.8 |
| 2015/0002623 | A1 * | 1/2015 | Masugi | H04N 23/62 348/37 |
| 2015/0172554 | A1 * | 6/2015 | Adachi | H04N 23/698 348/240.2 |
| 2017/0150031 | A1 * | 5/2017 | Oshima | G03B 17/561 |
| 2017/0155827 | A1 * | 6/2017 | Kim | H04N 23/62 |
| 2019/0124227 | A1 * | 4/2019 | Tabata | H04N 1/00785 |
| 2020/0059608 | A1 * | 2/2020 | Yorozu | G03B 17/18 |
| 2020/0084355 | A1 * | 3/2020 | Ishii | G06T 7/50 |
| 2022/0239838 | A1 * | 7/2022 | Idaka | H04N 23/58 |
| 2023/0353861 | A1 * | 11/2023 | Nordquist | F16M 11/205 |
| 2024/0394909 | A1 * | 11/2024 | Elcock | G06T 7/0002 |
| 2025/0211859 | A1 * | 6/2025 | Amano | H04N 23/69 |

* cited by examiner

CONTROL APPARATUS, METHOD, AND STORAGE MEDIUM TO POSITION IMAGE CAPTURE DIRECTION

BACKGROUND

Field

The present disclosure relates to a control technique for an image capturing device.

Description of the Related Art

Up to now, an image capturing device has been mounted to a pan/tilt head including a pan drive unit and a tilt drive unit, and these pan drive units and tilt drive units are driven to change a shooting direction of the image capturing device. In recent years, an image capturing device has been proposed that includes a rotation drive unit configured to rotate and drive an image capturing element about an optical axis. In addition, in the image capturing device, an aspect ratio of an image captured by the image capturing element is determined by a ratio of the number of pixels in a lateral direction and the number of pixels in a longitudinal direction on an image sensing surface. In the image capturing device including the rotation drive unit, by rotating and driving the image capturing element in which the image sensing surface is in a laterally long state with respect to a horizontal direction by the rotation drive unit about the optical axis by 90 degrees, an image that is longitudinally long can be obtained.

Japanese Patent Laid-Open No. 2007-114503 discloses a technique for enabling pan drive and tilt drive of the pan/tilt head and rotation drive of rotating the image capturing device or the image capturing element about the optical axis.

According to Japanese Patent Laid-Open No. 2007-114503, a pan/tilt head operation mode for controlling the pan drive and the tilt drive and a rotation operation mode for controlling the rotation drive can be selected. A user can perform an operation of rotating the image capturing device or the image capturing element about the optical axis to be set at any rotation angle in the rotation operation mode and can perform an operation of setting the pan/tilt head at any pan angle or tilt angle in the pan/tilt head operation mode. According to the technique disclosed in Japanese Patent Laid-Open No. 2007-114503 described above, for a purpose of attempting an improvement in operability, the pan drive and tilt drive and the rotation drive are separately controlled. However, in a case where an image is rotated to be set at any angle by the rotation drive, it may become difficult for the user to intuitively recognize to what extent pan/tilt directions of the pan/tilt head are to be operated at the time of the pan/tilt head operation mode to cause the image capturing device to face in a desired shooting direction.

SUMMARY

A control apparatus according to an aspect of the present disclosure includes one or more memories storing instructions and one or more processors executing the instructions to obtain a movement direction instructed by a user with respect to an image captured to be displayed by an image capturing unit, obtain at least one of a rotation angle by a rotation of the image capturing unit or an image capturing element of the image capturing unit about an optical axis of an imaging optical system or a rotation angle by a rotation of the displayed image about a center of the image, and control a first drive unit configured to move a shooting direction of the image capturing unit in a first direction and a second drive unit configured to move the shooting direction of the image capturing unit in a second direction that is different from the first direction, in which a movement of the shooting direction of the image capturing unit by the first drive unit and the second drive unit is controlled based on the rotation angle in a manner that the shooting direction of the image capturing unit matches the movement direction instructed by the user.

Further features of the present disclosure will become apparent from the following description of exemplary embodiments with reference to the attached drawings.

DESCRIPTION OF THE EMBODIMENTS

Hereinafter, embodiments according to the present disclosure will be described with reference to the drawings. The following embodiments are not seen to be limiting. Not all combinations of features described in the embodiments are used as solutions in the present disclosure, and multiple features may be optionally combined. Configurations of the embodiments may be appropriately modified or altered depending on a specification of an apparatus to which an aspect of the present disclosure is applied and various conditions (such as a use condition and a use environment). In addition, in each of the following embodiments, the same code is assigned to the same or similar component or processing step, and the redundant description will be omitted.

First Embodiment

Image Capturing System

Figure 1:
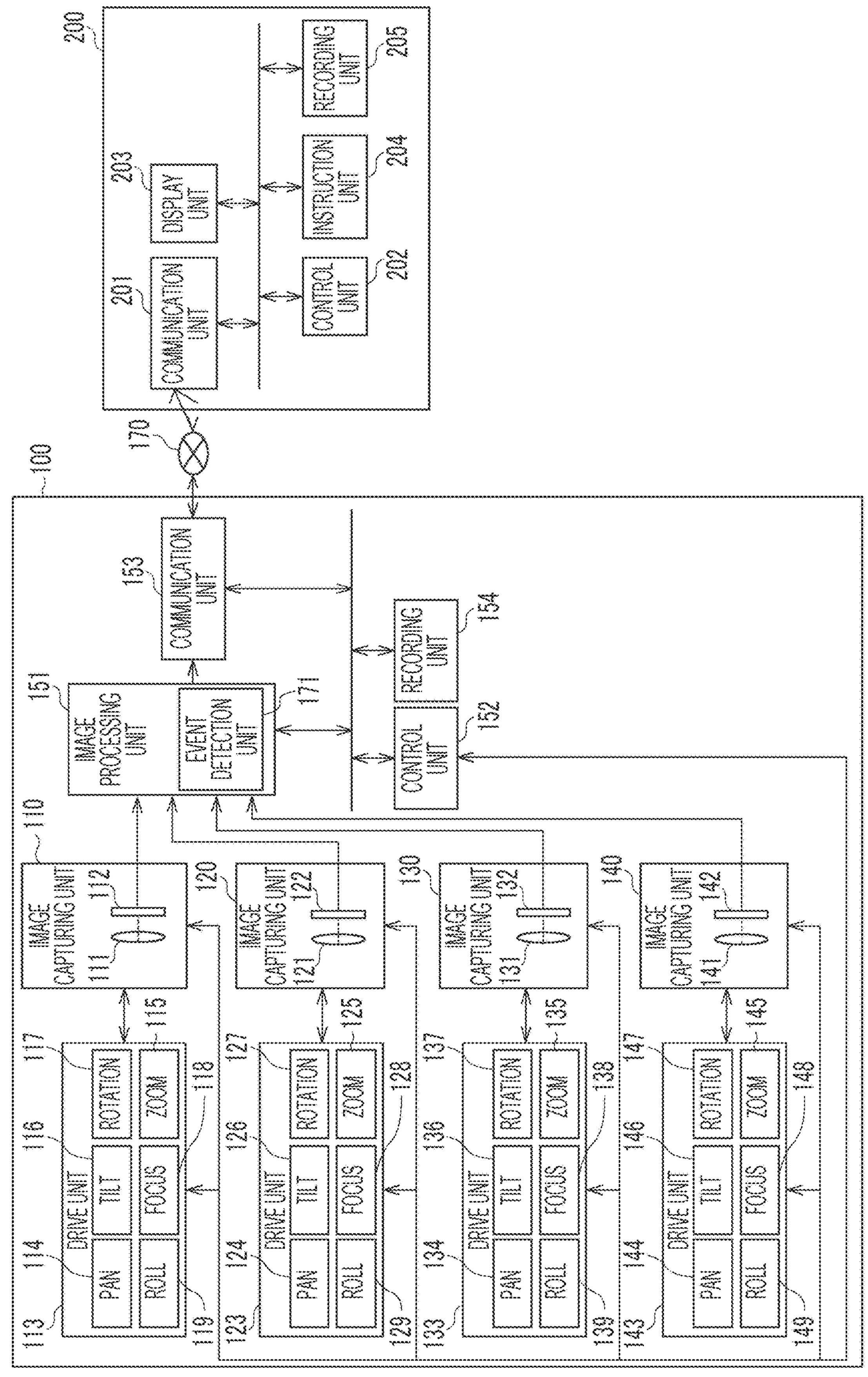
FIG. 1 illustrates a functional configuration example of an image capturing system of a first embodiment.

A configuration and a function of an image capturing system according to the first embodiment will be described with reference to FIG. 1. FIG. 1 illustrates a functional configuration of a camera 100 together with a client apparatus 200 that is an example of an information processing apparatus. The camera 100 is connected to the client apparatus 200 via the network 170. The camera 100 transmits captured image data to the client apparatus 200 and receives a control signal from the client apparatus 200.

The camera 100 includes four image capturing units and drive units independently provided for each of the image capturing units, an image processing unit 151, a control unit 152, a communication unit 153, and a storage unit 154. The four image capturing units include a first image capturing unit 110, a second image capturing unit 120, a third image capturing unit 130, and a fourth image capturing unit 140. Drive units corresponding to each of the first to fourth image capturing units 110 to 140 include a first drive unit 113, a second drive unit 123, a third drive unit 133, and a fourth drive unit 143.

First to Fourth Image Capturing Units

The first image capturing unit 110 is an image capturing device including a first imaging optical system (lens) 111 and a first image capturing element 112. The second image capturing unit 120 is an image capturing device including a second imaging optical system 121 and a second image capturing element 122. The third image capturing unit 130 is an image capturing device including a third imaging optical system 131 and a third image capturing element 132. The fourth image capturing unit 140 is an image capturing device including a fourth imaging optical system 141 and a fourth image capturing element 142. That is, the camera 100 of the present embodiment is a multi-lens camera including the four image capturing units 110 to 140.

The first imaging optical system 111 includes a focus lens and a zoom lens that can be driven in an optical axis direction. Each of the second imaging optical system 121, the third imaging optical system 131, and the fourth imaging optical system 141 includes a focus lens and a zoom lens.

The first imaging optical system 111 images transmitted light on the first image capturing element 112, and the first image capturing element 112 converts the imaging light into an electric signal to be output to the image processing unit 151. Similarly, signals that are obtained by the second imaging optical system 121 and the second image capturing element 122, the third imaging optical system 131 and the third image capturing element 132, and the fourth imaging optical system 141 and the fourth image capturing element 142 are transmitted to the image processing unit 151.

In addition, the first image capturing element 112 is configured to be rotatable about an optical axis of the first imaging optical system 111. Similarly, each of the second image capturing element 122, the third image capturing element 132, and the fourth image capturing element 142 is configured to be rotatable about an optical axis.

First to Fourth Drive units

The first drive unit 113 includes a first pan drive unit 114, a first tilt drive unit 116, a first rotation drive unit 117, a first roll drive unit 119, a first focus drive unit 118, and a first zoom drive unit 115. The second drive unit 123 includes a second pan drive unit 124, a second tilt drive unit 126, a second rotation drive unit 127, a second roll drive unit 129, a second focus drive unit 128, and a second zoom drive unit 125. The third drive unit 133 includes a third pan drive unit 134, a third tilt drive unit 136, a third rotation drive unit 137, a third roll drive unit 139, a third focus drive unit 138, and a third zoom drive unit 135. The fourth drive unit 143 includes a fourth pan drive unit 144, a fourth tilt drive unit 146, a fourth rotation drive unit 147, a fourth roll drive unit 149, a fourth focus drive unit 148, and a fourth zoom drive unit 145.

Control Unit

The control unit 152 controls the first image capturing unit 110 to the fourth image capturing unit 140, the first drive unit 113 to the fourth drive unit 143, the image processing unit 151, the communication unit 153, and the storage unit 154 in an overall manner through execution of a control program. The control unit 152 is configured by a central processing unit (CPU) or the like.

The control unit 152 decides drive directions and drive amounts of the first pan drive unit 114 and the first tilt drive unit 116 to control a shooting direction of the first image capturing unit 110, in other words, a direction of a shooting view angle that is decided by the first imaging optical system 111 and the first image capturing element 112. In addition, the control unit 152 controls the first zoom drive unit 115 to drive the zoom lens of the first imaging optical system 111, so that a shooting range (in other words, a shooting view angle) of the first image capturing unit 110. Moreover, the control unit 152 controls the first focus drive unit 118 to drive the focus lens of the first imaging optical system 111, so that a focus position of the first image capturing unit 110 is controlled. In addition, the control unit 152 controls the first rotation drive unit 117 to control a rotation angle that is a rotation angle of the first image capturing element 112 about the optical axis. Similarly, the control unit 152 controls the second image capturing unit 120 and the second drive unit 123 to control a shooting direction (direction of a shooting view angle), a shooting range (shooting view angle), a focus position, and a rotation angle of the second image capturing unit 120. Furthermore, the control unit 152 similarly controls the third image capturing unit 130 and the third drive unit 133, and the fourth image capturing unit 140 and the fourth drive unit 143 to control shooting directions, shooting ranges, focus positions, and rotation angles of the third image capturing unit 130 and the fourth image capturing unit 140.

It is noted that all or some of each of these functions by the control unit 152 may be realized by a control unit 202 of the client apparatus 200, which will be described below.

First to Fourth Pan Drive Units and First to Fourth Tilt Drive Units

The first image capturing unit 110 is mounted to the first pan drive unit 114. Similarly, the second image capturing unit 120 is mounted to the second pan drive unit 124, the third image capturing unit 130 is mounted to the third pan drive unit 134, and the fourth image capturing unit 140 is mounted to the fourth pan drive unit 144 separately. The first to fourth pan drive units 114 to 144 move image capturing directions of the respectively corresponding first to fourth image capturing units 110 to 140 in a horizontal direction that is set as a first direction. In the case of the present embodiment, the first to fourth pan drive units 114 to 144 perform pan drive so as to move the respectively corresponding first to fourth image capturing units 110 to 140 on the same circumference having the same rotatable shaft.

Figure 2:
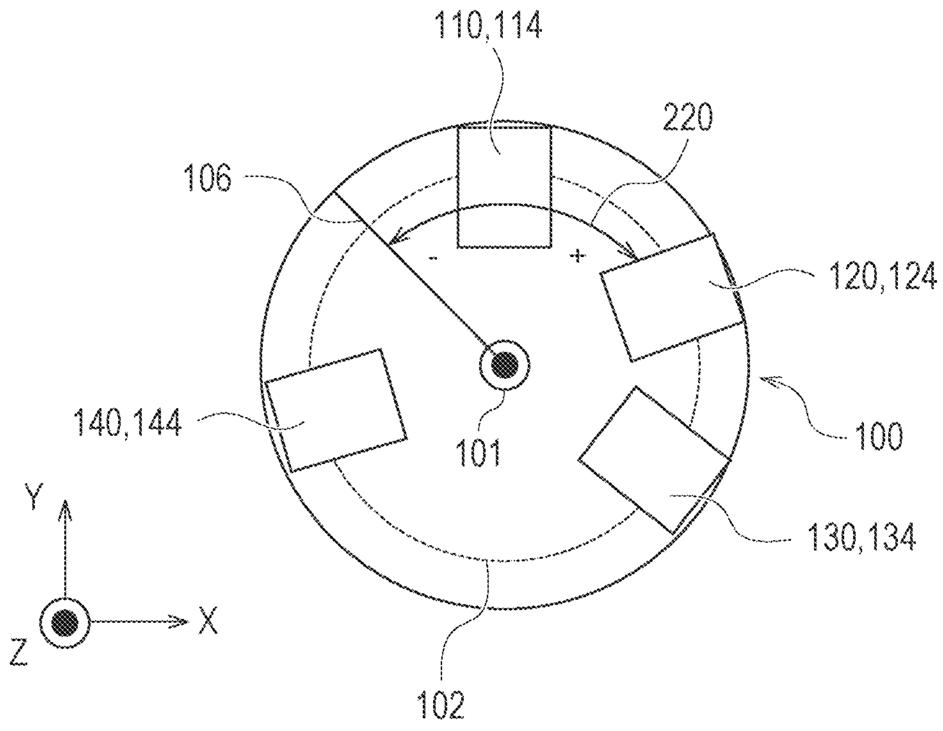
FIG. 2 is a diagram illustrating pan drive on a circumference of a plurality of image capturing units.

FIG. 2 is a schematic diagram illustrating an arrangement and a movement example on the same circumference of the first image capturing unit 110 to the fourth image capturing unit 140 in the camera 100 of the present embodiment. FIG. 2 illustrates a state in which while a clockwise direction is set as a + direction and a counterclockwise direction is set as a − direction, the first image capturing unit 110 to the fourth image capturing unit 140 located on the same circumference are viewed from a top side (+Z axis side). The first to fourth image capturing units 110 to 140 are mounted to the respectively corresponding first to fourth pan drive units 114 to 144, and the first to fourth pan drive units 114 to 144 move the first to fourth image capturing units 110 to 140 on the same circumference.

The first pan drive unit 114 includes a motor and a gear, and drive electric power of the motor is controlled by the control unit 152. The first pan drive unit 114 moves, under drive electric power control of the motor by the control unit 152, the first image capturing unit 110 in a pan direction indicated by an arrow 220 on a circumference 102 represented by a dotted line in which a shaft 101 is set as a rotatable shaft. Similarly, each of the second to fourth pan drive units 124 to 144 includes a motor and a gear, and drive electric power of each of the motors is controlled by the control unit 152. Under the drive electric power control of the motor by the control unit 152, the second to fourth pan drive units 124 to 144 move the second to fourth image capturing units 120 to 140 in the pan direction indicated by the arrow 220 on the circumference 102 in which the shaft 101 is set as the rotatable shaft.

Each of the first to fourth pan drive units 114 to 144 can be individually driven, and the control unit 152 can simultaneously drive and control one or a plurality of the first to fourth pan drive units 114 to 144. The first to fourth pan drive units 114 to 144 include sensors such as a photo interrupter and a Hall element, and the control unit 152 can obtain, based on output values of those sensors, a pan position of each of the first to fourth pan drive units 114 to 144.

In addition, the first to fourth pan drive units 114 to 144 move the respectively corresponding first to fourth image capturing units 110 to 140 on the common circumference 102 in the direction of the arrow 220, but a positional relationship among the first to fourth image capturing units 110 to 140 is not swapped. In addition, even in a case where the first to fourth image capturing units 110 to 140 respectively move on the circumference 102 by the first to fourth pan drive units 114 to 144, the first to fourth image capturing units do not move beyond a drive end 106. That is, the first to fourth image capturing units 110 to 140 move only on the circumference 102 that does not include the drive end 106.

It is noted that the drive end 106 may be a physical drive end based on hardware or may be a drive end that is not instructible from a user on software.

Figure 3:
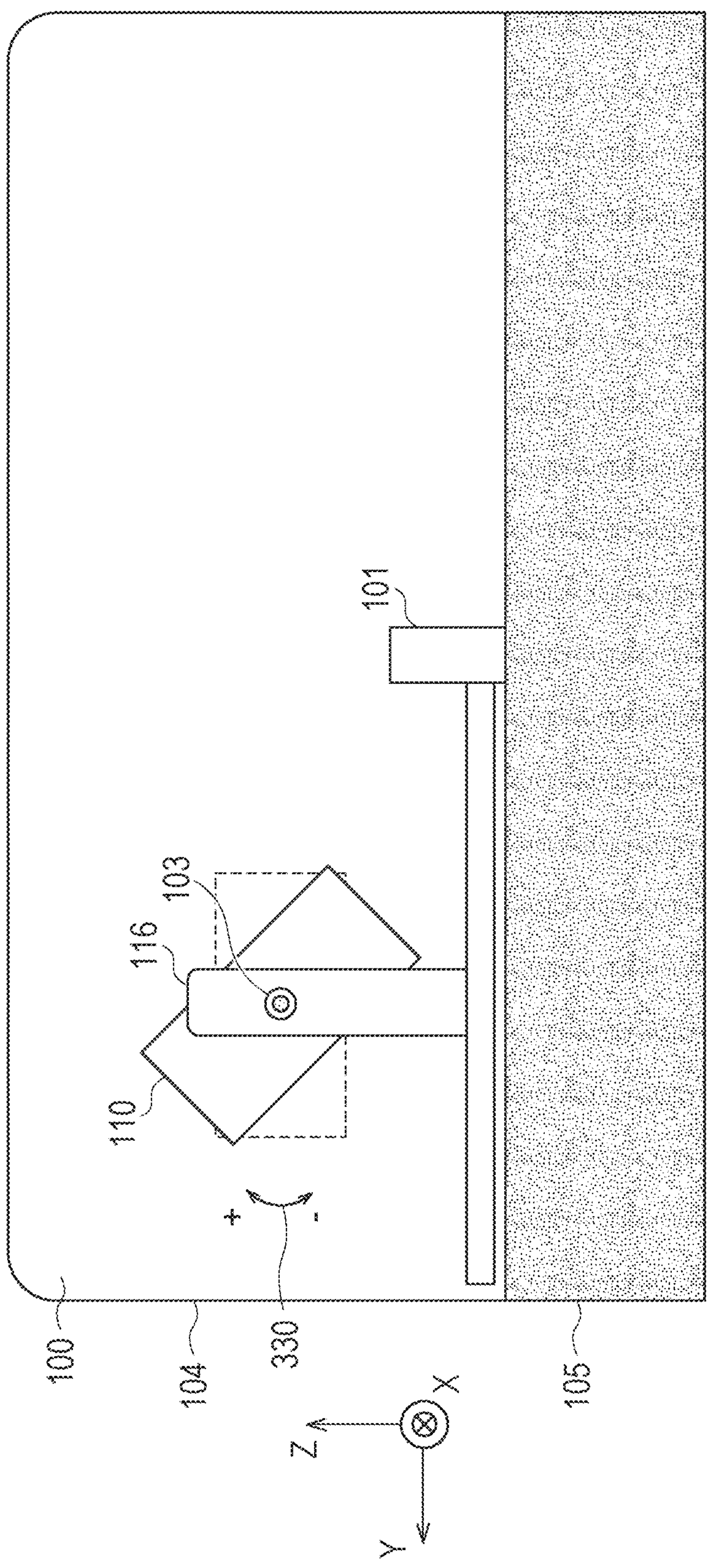
FIG. 3 is a diagram illustrating tilt drive of a single image capturing unit.

FIG. 3 is a schematic diagram illustrating the first image capturing unit 110 and the first tilt drive unit 116 capable of changing the shooting direction of the first image capturing unit 110 (direction of the shooting view angle) in a tilt direction. In FIG. 3, the description will be provided with examples of the first image capturing unit 110 and the first drive unit 113, but the same also applies to the second to fourth image capturing units 120 to 140 and the second to fourth drive units 123 to 143, and the description of those will be omitted appropriately.

FIG. 3 illustrates a state in which while an up direction is set as a + direction and a down direction is set as a − direction, the first image capturing unit 110 is viewed from a side (−X axis side). It is noted that the shaft 101 is the rotatable shaft illustrated in FIG. 2.

The first tilt drive unit 116 has a configuration in which while a shaft 103 is set as a rotatable shaft, the first image capturing unit 110 can be rotated in a direction indicated by an arrow 330. In addition, while the horizontal direction is set as a reference at 0 degrees, the first tilt drive unit 116 can be driven in a range from 0 degrees to +90 degrees while the shaft 103 is set as the rotatable shaft.

The first tilt drive unit 116 includes a motor and a gear, and drive electric power of the motor is controlled by the control unit 152. Under the drive electric power control of the motor by the control unit 152, the first tilt drive unit 116 can change the shooting direction of the first image capturing unit 110 (direction of the shooting view angle) in the tilt direction. Although not illustrated in the drawing, similarly, each of the second to fourth tilt drive units 126 to 146 includes a motor and a gear, and drive electric power of each of the motors is controlled by the control unit 152. Under the drive electric power control of the motor by the control unit 152, the second to fourth tilt drive units 126 to 146 can rotate the second to fourth image capturing units 120 to 140 in the tilt direction illustrated in the arrow 330 while the shaft 103 is set as the rotatable shaft. That is, the first to fourth tilt drive units 116 to 146 move the image capturing directions of the respectively corresponding first to fourth image capturing units 110 to 140 in a vertical direction that is the second direction.

In addition, each of the first to fourth tilt drive units 116 to 146 can be individually driven, and the control unit 152 can simultaneously drive and control one or a plurality of the first to fourth tilt drive units 116 to 146. In addition, the first to fourth tilt drive units 116 to 146 include sensors such as a photo interrupter and a Hall element, and the control unit 152 can obtain, based on output values of those sensors, a tilt position of each of the first to fourth tilt drive units 116 to 146.

It is noted that in the case of the first to fourth tilt drive units 116 to 146, as being different from the case of the first to fourth pan drive units 114 to 144 described above, since the first to fourth tilt drive units 116 to 146 do not physically interfere, the first to fourth image capturing units 110 to 140 do not also physically interfere in the tilt direction. The same also applies to the first to fourth zoom drive units 115 to 145, the first to fourth focus drive units 118 to 148, and the first to fourth rotation drive units 117 to 147 that have been described above, and those units do not physically interfere.

FIG. 3 also illustrates a dome 104 and a fixed section 105. The dome 104 covers and stores therein the first to fourth image capturing units 110 to 140, the first to fourth pan drive units 114 to 144, and the first to fourth tilt drive units 116 to 146. The dome 104 includes a member made of transparent plastic or glass. Therefore, the first image capturing unit 110 to the fourth image capturing unit 140 can capture an image of a surrounding area via the transparent dome 104. The fixed section 105 is a fixed member attached to a celling, a floor, a wall, or the like. That is, the dome 104 and the shaft 101, the first to fourth image capturing units 110 to 140, the first to fourth pan drive units 114 to 144, and the first to fourth tilt drive units 116 to 146 are attached to the celling, the floor, the wall, or the like via the fixed section 105.

Zoom Drive Unit and Focus Drive Unit

The first zoom drive unit 115 includes a motor and a gear and drives, based on the motor drive electric power control from the control unit 152, the zoom lens of the first imaging optical system 111. Similarly, each of the second to fourth zoom drive units 125 to 145 includes a motor and a gear and drives, based on the motor drive electric power control from the control unit 152, the second to fourth zoom drive units drive the zoom lenses of the respectively corresponding second to fourth imaging optical systems 121 to 141. According to this, each of the shooting ranges (shooting view angles and zoom factors) of the first to fourth image capturing units 110 to 140 is changed. It is noted that according to the present embodiment, a telephoto end direction by the drive of the zoom lens is set as a + direction, and a wide angle end direction is set as a − direction. Each of the first to fourth imaging optical systems 111 to 141 includes sensors such as a photo interrupter and a Hall element, and the control unit 152 can obtain, based on output values of those sensors, a position of the zoom lens of each of the first to fourth imaging optical systems 111 to 141. In addition, each of the first to fourth zoom drive units 115 to 145 can be individually driven, and the control unit 152 can simultaneously drive and control one or a plurality of the first to fourth zoom drive units 115 to 145.

The first focus drive unit 118 includes a motor and a gear and drives, based on the motor drive electric power control from the control unit 152, the focus lens of the first imaging optical system 111. Similarly, each of the second to fourth focus drive units 128 to 148 includes a motor and a gear, and the second to fourth focus drive units drive, based on the motor drive electric power control from the control unit 152, the focus lenses of the respectively corresponding second to fourth imaging optical systems 121 to 141. According to this, each of focus positions of the first to fourth image capturing units 110 to 140 is changed. It is noted that according to the present embodiment, a distal direction by drive of the focus lens is set as a + direction, and a proximal direction is set as a − direction. Each of the first to fourth imaging optical systems 111 to 141 includes sensors such as a photo interrupter and a Hall element, and the control unit 152 can obtain, based on output values of those sensors, a position of the focus lens of each of the first to fourth imaging optical systems 111 to 141. In addition, each of the first to fourth focus drive units 118 to 148 can be individually driven, and the control unit 152 can simultaneously drive and control one or a plurality of the first to fourth focus drive units 118 to 148.

Rotation Drive Unit

The first rotation drive unit 117 includes a motor and a gear and rotates and drives, based on the motor drive electric power control from the control unit 152, the first image capturing element 112 in the direction about the optical axis. Similarly, each of the second to fourth rotation drive units 127 to 147 includes a motor and a gear, and the second to fourth rotation drive units rotate and drive, based on the motor drive electric power control from the control unit 152, the respectively corresponding second to fourth image capturing elements 122 to 142 in the direction about the optical axis. According to this, each of the rotation angles of the first to fourth image capturing elements 112 to 142 in the direction about the optical axis is changed. In addition, each of the first to fourth image capturing elements 112 to 142 includes sensors such as a photo interrupter and a Hall element, and the control unit 152 can obtain, based on output values of those sensors, rotation angles in the direction about the optical axis of the first to fourth image capturing elements 112 to 142. In addition, each of the first to fourth rotation drive units 117 to 147 can be individually driven, and the control unit 152 can simultaneously drive and control one or a plurality of the first to fourth rotation drive units 117 to 147.

Herein, an aspect ratio of a captured image that has been captured by the image capturing element is decided by a ratio of the number of pixels in the horizontal direction and the number of pixels in the vertical direction. According to the present embodiment, for example, a rotation angle in a state in which the captured image to be captured by the image capturing element has a laterally long aspect ratio with respect to the horizontal direction is set as a reference angle of 0°, a clockwise direction of the rotation direction about the optical axis is set as a + direction, and a counter-clockwise direction is set as a − direction. In addition, the first to fourth rotation drive units 117 to 147 of the present embodiment are set to be capable of performing rotation drive from −180 degrees to +180 degrees as the rotation angle in the direction about the optical axis. For example, from a state in which the captured image of the first image capturing element 112 has a laterally long aspect ratio, the captured image of the first image capturing element 112 turns to have a longitudinally long aspect ratio in a case where the first rotation drive unit 117 rotates and drives the first image capturing element 112 by +90 degrees about the optical axis.

Figure 4:
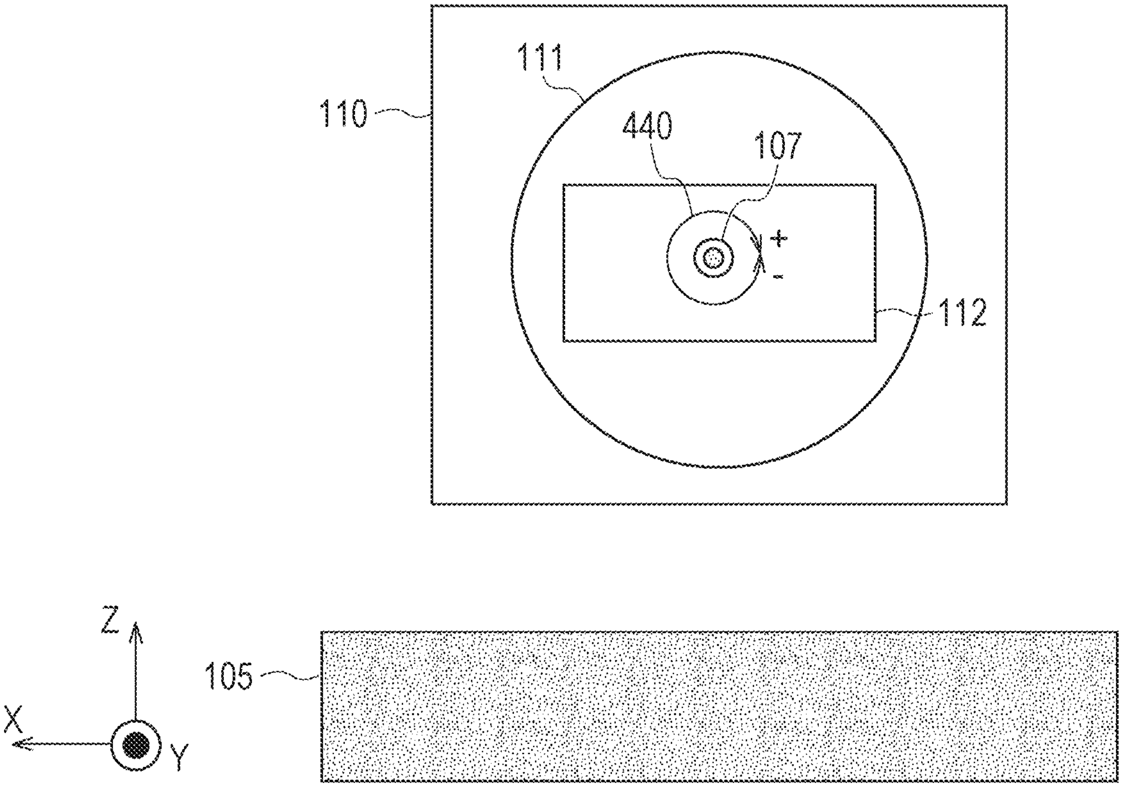
FIG. 4 is a diagram illustrating rotation drive of an image capturing element.

FIG. 4 is a schematic diagram in which the first image capturing unit 110 is viewed from a front of the first imaging optical system 111 and is a diagram in which for ease of the description, the first imaging optical system 111 and the first image capturing element 112 are superimposed (seen through). FIG. 4 also illustrates the fixed section 105, but the pan/tilt head to which the first image capturing unit 110 is mounted is not illustrated in the drawing. A shaft 107 represents a rotatable shaft of the first rotation drive unit 117, and the first rotation drive unit 117 rotates and drives the first image capturing element 112 in a direction indicated by an arrow 440 while the shaft 107 is set as a rotation center. The shaft 107 (rotatable shaft) of the first rotation drive unit 117 is preferably at a center of the optical axis of the first imaging optical system 111. It is noted that in FIG. 4, the description will be provided with the examples of the first image capturing unit 110 and the first drive unit 113, but the second to fourth image capturing units 120 to 140 and the second to fourth drive units 123 to 143 are also similar, and the description of those will be appropriately omitted.

In addition, according to the present embodiment, an example is described in which rotation drive of the first image capturing element 112 is performed, but such a rotation may be performed that the first image capturing unit 110 itself is caused to rotate about the optical axis of the first imaging optical system 111. Similarly, such rotations may be performed that the second to fourth image capturing units 120 to 140 themselves are caused to rotate about the optical axes of the respectively corresponding second to fourth imaging optical systems 121 to 141. In these cases too, the captured images output from the first to fourth image capturing units 110 to 140 are images that are rotated about the optical axes, and similar captured images can be obtained as in the case where the first to fourth image capturing elements 112 to 142 are rotated about the optical axes.

Roll Drive Unit

The first roll drive unit 119 is a drive unit configured to rotate and drive the first image capturing unit 110 in the pan direction while being independent from the first pan drive unit 114 described above. Similarly, the second to fourth roll drive units 129 to 149 are drive units configured to rotate and drive the respectively corresponding second to fourth image capturing units 120 to 140 in the pan direction while being independent from the second to fourth pan drive units 124 to 144 described above. Each of the first to fourth roll drive units 119 to 149 includes a motor and a gear and independently rotates and drives, based on the motor drive electric power control from the control unit 152, the respectively corresponding first to fourth image capturing units 110 to 140 in the pan direction. According to this, the shooting direction of each of the first to fourth image capturing units 110 to 140 is changed in the pan direction.

Herein, the first to fourth roll drive units 119 to 149 are different from the first to fourth pan drive units 114 to 144 in rotatable shafts. That is, since the rotatable shafts of the first to fourth pan drive units 114 to 144 are the shaft 101 that is common to a center (or near the center) of the camera 100 as illustrated in FIG. 2, the first to fourth image capturing units 110 to 140 move on the above-described same circumference 102. In contrast, the rotatable shafts of the first to fourth roll drive units 119 to 149 are independent rotatable shafts for each of the first to fourth image capturing units 110 to 140. Each of the first to fourth roll drive units 119 to 149 includes sensors such as a photo interrupter and a Hall element, and the control unit 152 can obtain, based on output values of those sensors, a rotation angle (pan position) of each of the first to fourth roll drive units 119 to 149. In addition, each of the first to fourth roll drive units 119 to 149 can be individually driven, and the control unit 152 can simultaneously drive and control one or a plurality of the first to fourth roll drive units 119 to 149.

Figure 5:
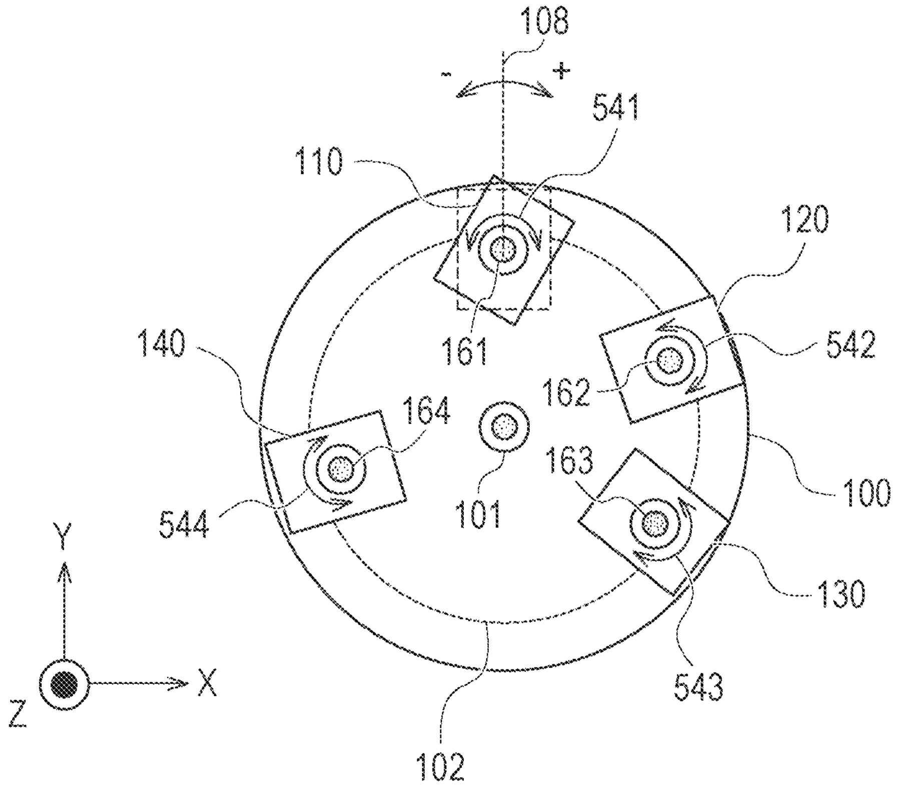
FIG. 5 is a diagram illustrating roll drive in each of the image capturing units on the circumference.

FIG. 5 is a diagram used to explain an example of independent rotation drive of each of the first to fourth image capturing units 110 to 140 in the pan direction by the first to fourth roll drive units 119 to 149. FIG. 5 illustrates a state in which while a clockwise direction is set as a + direction and a counterclockwise direction is set as a − direction, the first to fourth image capturing units 110 to 140 on the same circumference 102 are viewed from the top side (+Z axis side) similarly as in FIG. 2 described above. It is noted that the tilt angles of the first to fourth image capturing units 110 to 140 are set as 0 degrees. A shaft 161 represents a rotatable shaft of the first roll drive unit 119 corresponding to the first image capturing unit 110, and the first roll drive unit 119 can change an orientation of the first image capturing unit 110 in a direction of an arrow 541. In addition, a direction indicated by a dotted line 108 that passes through the shaft 101 and the shaft 161 is set as a front direction (reference direction) of 0 degrees, and the first roll drive unit 119 can change the shooting direction of the first image capturing unit 110 within a range from −30 degrees to +30 degrees. Similarly, shafts 162 to 164 respectively represent rotatable shafts of the second to fourth roll drive units 129 to 149 respectively corresponding to the second to fourth image capturing units 120 to 140. Therefore, the second to fourth roll drive units 129 to 149 can respectively change the shooting directions of the second to fourth image capturing units 120 to 140 in directions of arrows 542 to 544. In addition, while each of directions that passes through the respectively corresponding shafts 162 to 164 from the shaft 101 is set as the front direction (reference direction) of 0 degrees, the second to fourth roll drive units 129 to 149 change respective orientations of the second to fourth image capturing units 120 to 140 in a range from −30 degrees to +30 degrees.

Supplement of Rotatable Shaft

As described above, the first to fourth pan drive units 114 to 144 include the rotatable shaft (shaft 101) commonly used by the first to fourth image capturing units 110 to 140. In contrast, the first to fourth tilt drive units 116 to 146 include the independent rotatable shafts (shafts 103) for each of the respectively corresponding first to fourth image capturing units 110 to 140. Similarly, the first to fourth roll drive units 119 to 149 include the independent rotatable shafts (shafts 161 to 164) for each of the respectively corresponding first to fourth image capturing units 110 to 140. Similarly, the first to fourth rotation drive units 117 to 147 include the independent rotatable shafts (shafts 107) for each of the respectively corresponding first to fourth image capturing units 110 to 140.

Image Processing Unit

The image processing unit 151 performs predetermined image processing on the image capture signals input from the first image capturing unit 110, the second image capturing unit 120, the third image capturing unit 130, and the fourth image capturing unit 140 to generate pieces of captured image data and outputs each piece of the captured image data to the communication unit 153. For example, the image processing unit 151 generates each piece of the captured image data by performing development processing (arithmetic operation) on the image capture signals of the first to fourth image capturing units 110 to 140 according to a predetermined display format.

In addition, the image processing unit 151 includes an event detection unit 171. The event detection unit 171 detects a predetermined event from the captured images of the first to fourth image capturing units 110 to 140. For example, in a case where a moving object in the captured image is to be detected as the event, the event detection unit 171 calculates a difference in brightness between frames of the captured image to obtain a change in brightness and determines that the moving object is detected in a case where there is a change in brightness. The predetermined event to be detected by the event detection unit 171 may be instructed via the instruction unit 204 by a user of the client apparatus 200, which will be described below.

Furthermore, the image processing unit 151 of the present embodiment also creates on-screen display (OSD) (superimposed display) data to be used for a graphical user interface (GUI) for captured images of the first to fourth image capturing units 110 to 140. In the case of the present embodiment, the OSD-based GUI is used as a user interface (UI) that can be operated by the user in the client apparatus 200 that will be described below. According to the present embodiment, the OSD-based GUI is used for the user of the client apparatus 200 to operate the first to fourth drive units 113 to 143 or to make the shooting directions and positional relationship of the first to fourth image capturing units 110 to 140 visible. The OSD data also includes symbols representing the shooting directions and positional relationship of the first to fourth image capturing units 110 to 140.

In addition, for example, in the case of use for displaying a plurality of captured images by the first to fourth image capturing units 110 to 140 on the same screen, the image processing unit 151 generates an image in which the plurality of captured images are arranged longitudinally and laterally or arranged in a single row or column.

In addition to the above, the image processing unit 151 can perform image processing such as inversion, rotation, or the like of the captured images.

It is noted that all or part of each of these functions by the image processing unit 151 may be realized by the control unit 202 of the client apparatus 200, which will be described below.

Communication Unit

The communication unit 153 transfers the image data transmitted from the image processing unit 151 or the OSD data via the network 170 such as a wired local area network (LAN) or a wireless LAN to the client apparatus 200. In addition, the communication unit accepts an instruction from the client apparatus 200.

Recording Unit

The storage unit 154 is configured by a random access memory (RAM) or a read only memory (ROM) and stores various programs including the control program to be executed by the control unit 152. In addition, the storage unit 154 is used as a temporally storage region of image data.

Client Apparatus

The client apparatus 200 is configured by including a communication unit 201, the control unit 202, a display unit 203, an instruction unit 204, and a recording unit 205. The client apparatus 200 is, for example, equipment such as a personal computer.

The communication unit 201 communicates with the camera 100 via the network 170. In addition, the client apparatus 200 may include a component configured to supply a power supply to the camera 100 via the network 170.

The display unit 203 causes the image or the like transmitted from the camera 100, the above-described OSD-based GUI, or the like to be displayed on a display screen of the display apparatus.

The instruction unit 204 includes a UI and accepts operation information by the user on a mouse (pointing device), a keyboard, or a touch panel. The touch panel is provided, for example, in the screen of the display apparatus, and the user can perform an operation instruction through an operation on the touch panel.

The recording unit 205 is configured by a ROM or a RAM and temporarily stores a computer program or stores a program or the like for the control unit 202 to control the client apparatus 200 in an overall manner.

The control unit 202 includes a function of the CPU and performs an overall control of the client apparatus 200 through execution of the program recorded in the recording unit 205. In the case of the present embodiment, the control unit 202 generates a control signal for controlling the camera 100 according to the instruction on the GUI or the like that has been input via the instruction unit 204 from the user. In the case of the present embodiment, the control signal is a signal for controlling the first to fourth image capturing units 110 to 140 or the first to fourth drive units 113 to 143 through the control by the control unit 152 of the camera 100. That is, the user can perform the operation (control according to the operation) on the first to fourth image capturing units 110 to 140 or the first to fourth drive units 113 to 143 of the camera 100 through the operation on the GUI via the instruction unit 204 of the client apparatus 200. It is noted that as described above, part or all of the functions of the control unit 152 and the image processing unit 151 of the camera 100 that have been described above may be realized by the control unit 202 of the client apparatus 200.

Figure 6:
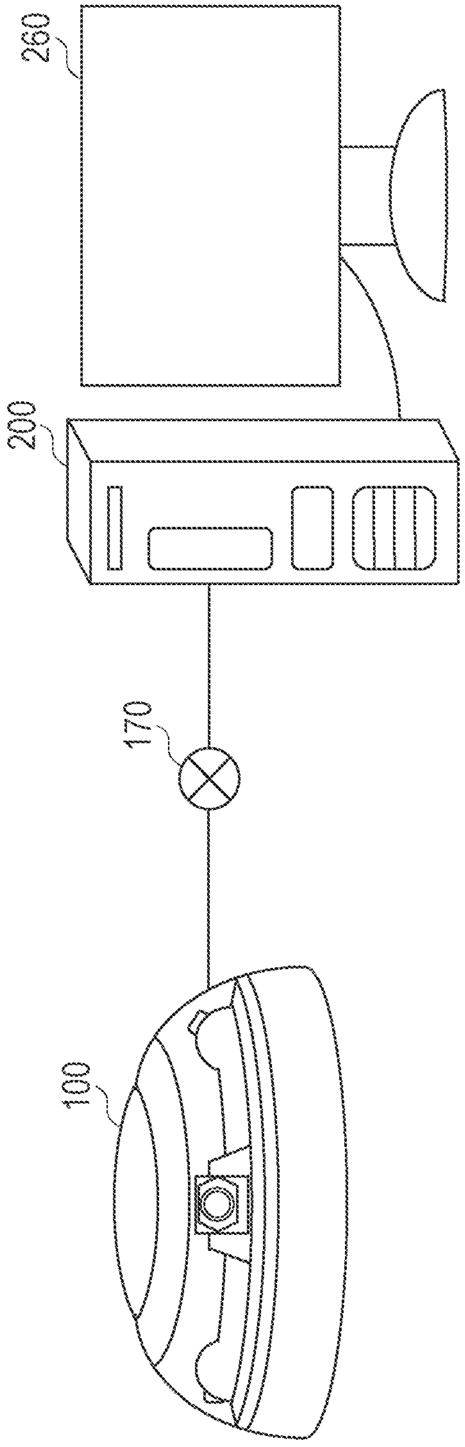
FIG. 6 illustrates a schematic configuration example of the image capturing system.

FIG. 6 illustrates a schematic configuration example of the image capturing system including the camera 100 and the client apparatus 200 of the present embodiment.

The camera 100 is connected to the client apparatus 200 via the network 170.

FIG. 6 illustrates an example of a desktop personal computer in which the client apparatus 200 and a display apparatus 260 are separate components, but the client apparatus 200 may be a laptop personal computer, a tablet terminal, or the like in which a display is integrated.

Figure 7:
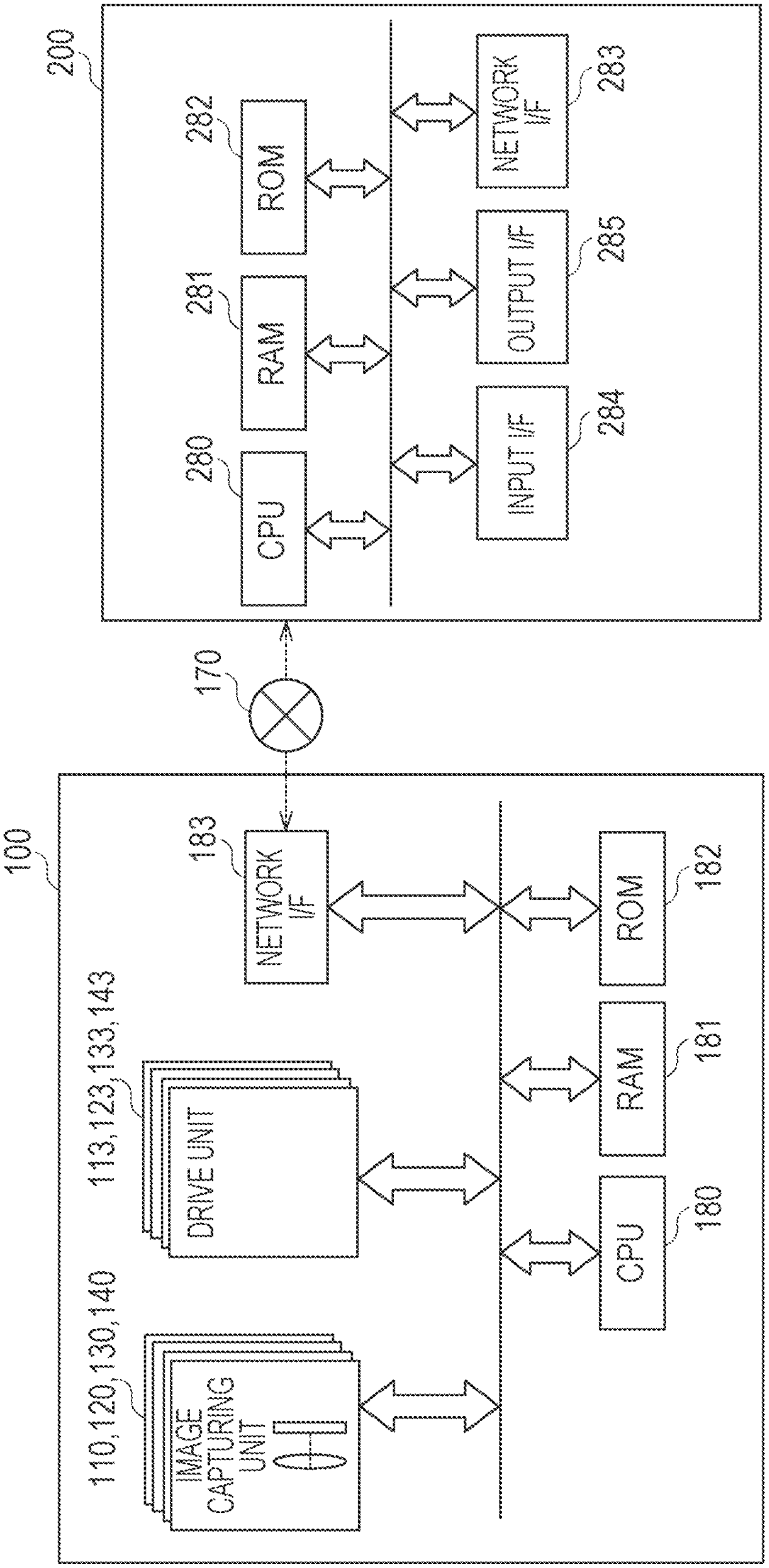
FIG. 7 illustrates a hardware configuration example of the image capturing system of the first embodiment.

FIG. 7 illustrates a hardware configuration example of the camera 100 and the client apparatus 200.

The camera 100 includes the first to fourth image capturing units 110 to 140 and the first to fourth drive units 113 to 143 that have been described above, a network I/F 183, a CPU 180, a RAM 181, and a ROM 182.

The ROM 182 stores the control program for the CPU 180 to control the camera 100 in an overall manner.

The RAM 181 temporarily stores the control program to be executed by the CPU 180. In addition, the RAM 181 provides a work area to be used when the CPU 180 executes control or processing. In addition, the RAM 181 functions as a frame memory or functions as a buffer memory.

The CPU 180 is a central processing unit configured to control the camera 100 in an overall manner. In addition, the CPU 180 realizes operations of the respective function units of the control unit 152, the image processing unit 151, and the communication unit 153 by executing the control program deployed in the RAM 181 from the ROM 182.

The network I/F 183 transmits the image and the OSD data, which are obtained when the CPU 180 executes the processing related to the function of the image processing unit 151, via the network 170 to the client apparatus 200. It is noted that the captured image data by the first to fourth image capturing units 110 to 140 may be stored in an internal storage device such as the RAM 181 or a storage medium that is not illustrated in the drawing such as a detachable and attachable SD card.

The client apparatus 200 is an information processing apparatus including a CPU 280, a RAM 281, a ROM 282, an input I/F 284, an output I/F 285, and a network I/F 283.

The RAM 281 provides a work area to be used when the CPU 280 executes data processing. In addition, the RAM 281 functions as a frame memory or functions as a buffer memory.

The ROM 282 stores a program or the like for the CPU 280 to control the client apparatus 200.

The CPU 280 is a central processing unit configured to execute a program deployed in the RAM 281 from the ROM 282. According to this, the CPU 280 performs overall control of the client apparatus 200 and control of the first to fourth image capturing units 110 to 140 or the first to fourth drive units 113 to 143 via the control unit 152 of the camera 100.

The input I/F 284 is an interface connected to the instruction unit 204 and configured to accept an instruction by the user that is input via the instruction unit 204 to the client apparatus 200. The input I/F 284 also similarly accepts operation information according to the user instruction for the camera 100 that has been input via the instruction unit 204. In this manner, the client apparatus 200 can obtain the user instruction for the first to fourth image capturing units 110 to 140 or the first to fourth drive units 113 to 143 of the camera 100 via the input I/F 284.

The output I/F 285 is an interface connected to the display unit 203 and configured to cause the image transmitted from the camera 100 and the OSD-based GUI to be displayed on the screen of the display unit 203.

The network I/F 283 is connected to the camera 100 via the network 170.

The network I/F 283 is an interface through which the control signal generated by the CPU 280 based on the operation information on the camera 100 that has been input through the input I/F 284 is transmitted and the image data transmitted from the camera 100, the OSD data, or the like is received.

Description on how Image and Object Incline by Drive of Rotation Drive Unit

As described above, the camera 100 of the present embodiment can rotate and drive the image capturing element about the optical axis by the rotation drive unit. Hereinafter, the description will be provided with an example of a case where the first rotation drive unit 117 rotates and drives the first image capturing element 112 of the first image capturing unit 110 about the optical axis.

FIGS. 8A and 8B, FIGS. 9A and 9B, and FIGS. 10A and 10B are diagrams used to explain how an image sensing surface of the first image capturing element 112 and an object incline in a case where the first rotation drive unit 117 rotates and drives the first image capturing element 112 about the optical axis. According to the present embodiment, the description will be provided where a rotation angle about an optical axis by the first rotation drive unit 117 is set as θ. It is noted that as described above, the control unit 152 can obtain, based on output values of the sensors such as the photo interrupter and the Hall element arranged in the first image capturing element 112, the rotation angle θ in the direction about the optical axis of the first image capturing element 112.

First, a relationship between the captured image of the first image capturing element 112 when being rotated about the optical axis and driven by the first rotation drive unit 117 and the object will be described with reference to FIGS. 8A and 8B.

Figure 8A:
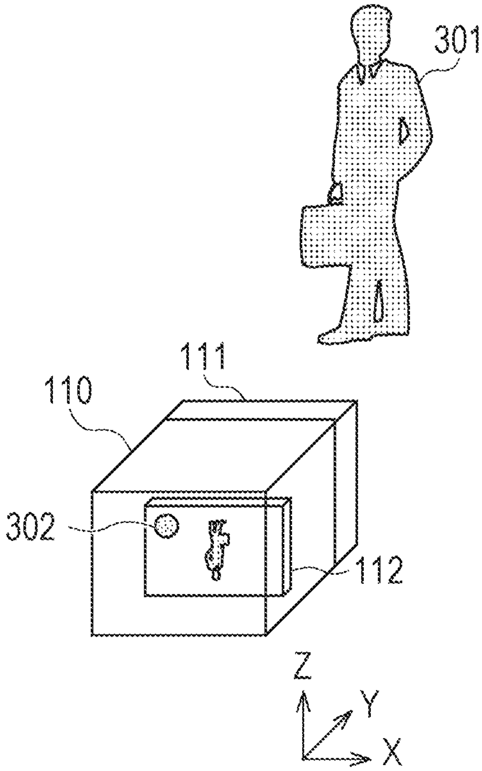
FIGS. 8A and 8B are diagrams illustrating a relationship between the rotation drive and an object.

FIG. 8A illustrates a state in which the rotation angle θ by the first rotation drive unit 117 is 0 degrees. The state in which the rotation angle is 0 degrees is set as a state in which the image sensing surface of the first image capturing element 112 is laterally long with respect to the horizontal direction, and hereinafter, this state will be referred to as a lateral shooting state. FIG. 8A represents a situation where an object 301 is captured by the first image capturing element 112 in the lateral shooting state. It is noted that the object 301 imaged on the first image capturing element 112 turns into an upside down and left to right reversed image by the lens of the first imaging optical system 111 as illustrated in FIG. 8A. For explanation, in FIG. 8A, a mark 302 is added to a position of a top left pixel in the image sensing surface of the first image capturing element 112.

Figure 8B:
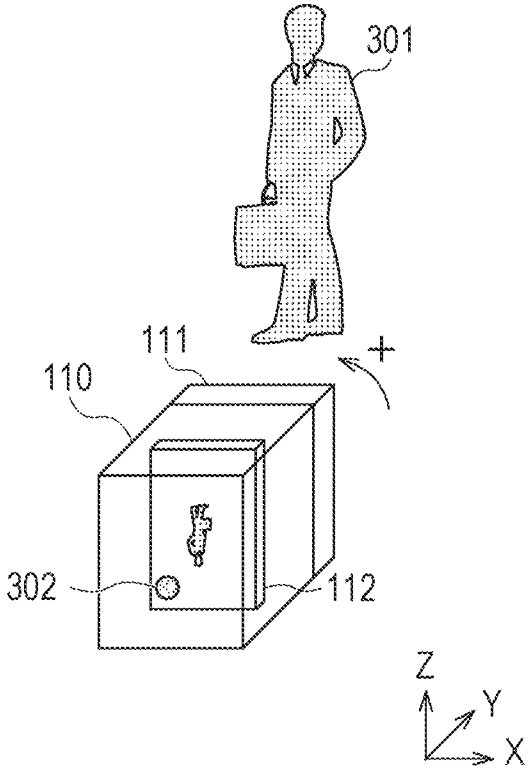

FIG. 8B illustrates a state in which the rotation angle θ by the first rotation drive unit 117 is +90 degrees (state after the 90-degree rotation in the + direction illustrated in FIG. 4). In a state in which the rotation angle is +90 degrees, the image sensing surface of the first image capturing element 112 is put into a longitudinally long state with respect to the horizontal direction, and hereinafter, this state will be referred to as a longitudinal shooting state. FIG. 8B represents a situation where the object 301 is captured in the longitudinal shooting state by the first image capturing element 112. In FIG. 8B too, the object 301 imaged on the first image capturing element 112 turns into an upside down and left to right reversed image by the lens of the first imaging optical system 111. In FIG. 8B too, for the explanation, the mark 302 is added to the position of the top left pixel in the image sensing surface of the first image capturing element 112.

Next, display examples of an image obtained by image capturing in the lateral shooting state and an image obtained by image capturing in the longitudinal shooting state will be described with reference to FIGS. 9A and 9B. It is noted that in FIGS. 9A and 9B too, for the explanation, the mark 302 is added to the position of the top left pixel in the image captured by the first image capturing element 112.

Figure 9A:
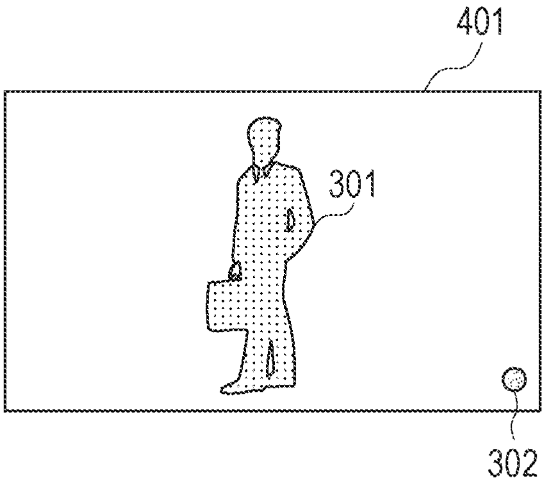
FIGS. 9A and 9B illustrate examples of an image in a lateral shooting state and an image in a longitudinal shooting state.

FIG. 9A illustrates a display example in a case where an image 401 captured in the lateral shooting state as illustrated in FIG. 8A and developed is displayed on the screen at a laterally long aspect ratio with respect to the horizontal direction. As illustrated in FIG. 8A, since the image of the object 301 is captured while being upside down and left to right reversed by the lens of the first imaging optical system 111, in FIG. 9A, an image after the 180-degree rotation (image after the development) is displayed such that it is facilitated to view the captured image.

Figure 9B:
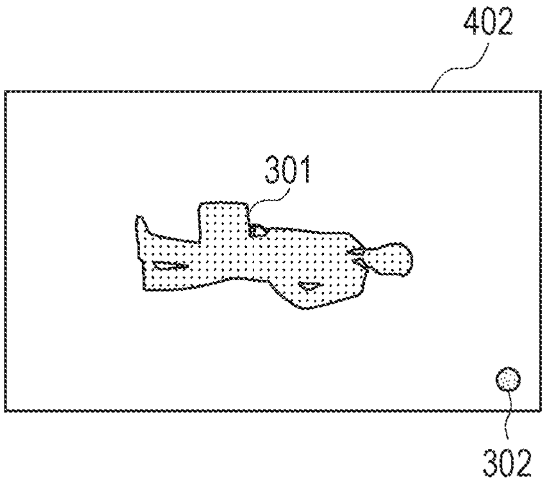

FIG. 9B illustrates a display example in a case where the image 402 captured in the longitudinal shooting state illustrated in FIG. 8B and developed is displayed on the screen at a laterally long aspect ratio with respect to the horizontal direction. As illustrated in FIG. 8B, since the image of the object 301 is captured while being upside down and left to right reversed by the lens of the first imaging optical system 111, in FIG. 9B too, an image after the 180-degree rotation (image after the development) is displayed such that it is facilitated to view the captured image.

When these display examples of FIG. 9A and FIG. 9B are compared, in the case of the image 401 in the lateral shooting state illustrated in FIG. 9A, a state in which the object 301 is upright is displayed at a laterally long aspect ratio on the screen. In contrast, in the case of the image 402 in the longitudinal shooting state illustrated in FIG. 9B, a state in which the object 301 is inclined by 90 degrees is displayed at a laterally long aspect ratio on the screen. In other words, depending on the rotation angle θ, the object 301 may be displayed while being inclined.

Next, a change will be described with reference to FIGS. 10A and 10B on how the display image is viewed in the lateral shooting state illustrated in FIG. 8A and the longitudinal shooting state illustrated in FIG. 8B, for example, in a case where the first image capturing unit 110 is panned to be driven by the first pan drive unit 114.

Figure 10A:
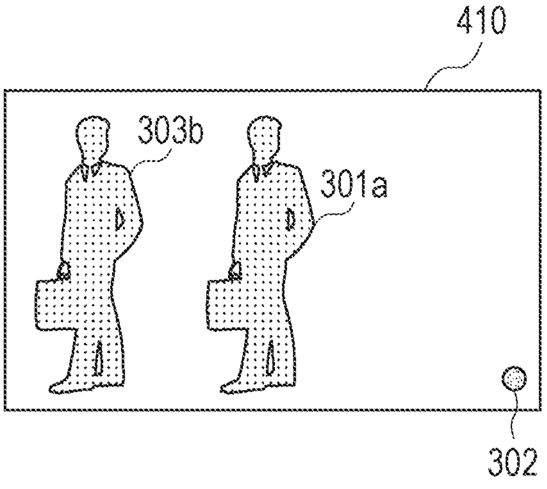
FIGS. 10A and 10B illustrate changes of the image based on the pan drive at the time of rotation.

FIG. 10A illustrates a changed example of the image 410 that is displayed when the first image capturing unit 110 is panned to be driven by the first pan drive unit 114 in a + direction (right direction on paper) of an X axis at the time of image capturing in the lateral shooting state in FIG. 8A. An object 301*a* depicted in the image 410 of FIG. 10A represents an object before pan drive, and an object 303*b* represents an object after the pan drive. That is, in a case where the first image capturing unit 110 is panned to be driven in the + direction of the X axis in the lateral shooting state, since the shooting direction of the first image capturing unit 110 moves in the + direction (right direction on paper) of the X axis, the object 301 relatively moves in a − direction (left direction) with respect to the first image capturing unit 110. Therefore, on the display screen, the object 301*a* before the pan drive moves to a position of the object 303*b* after the pan drive.

Figure 10B:
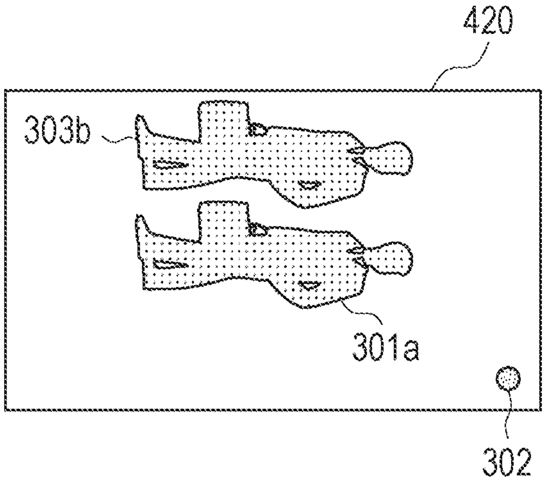

FIG. 10B illustrates a changed example of the image 420 that is displayed when the first image capturing unit 110 is panned to be driven by the first pan drive unit 114 in the + direction of the X axis (that is the down direction on paper) at the time of image capturing in the longitudinal shooting state in FIG. 8B. The object 301*a* depicted in the image 420 of FIG. 10B represents an object before pan drive, and the object 303*b* represents an object after the pan drive. That is, in a case where the first image capturing unit 110 is panned to be driven in the longitudinal shooting state in the + direction of the X axis, since the shooting direction of the first image capturing unit 110 moves in the + direction of the X axis (that is the down direction on paper), the object 301 relatively moves in the − direction (that is the up direction on paper) with respect to the first image capturing unit 110. Therefore, on the display screen, the object 301*a* before the pan drive moves to the position of the object 303*b* after the pan drive.

In this manner, in the lateral shooting state and the longitudinal shooting state, even in a case where the first image capturing unit 110 is panned to be driven in the same direction, when the rotation angle of the first image capturing unit 110 is different, it may be found out that how the change of the position of the object is viewed along with the pan drive of the display image differs. It is noted that in the examples of FIGS. 8A and 8B, FIGS. 9A and 9B, and FIGS. 10A and 10B, the pan drive of the first image capturing unit 110 has been described as an example, but similarly as in the cases of the other second to fourth image capturing units 120 to 140, when the rotation angle is different, how the change of the position of the object is viewed along with the pan drive of the display image differs.

In addition, in the example of FIGS. 10A and 10B, the example of pan drive of the first image capturing unit 110 by the first pan drive unit 114 has been described, but similarly also in a case where the first image capturing unit 110 is panned to be driven by the first roll drive unit 119, when the rotation angle is different, how the change of the position of the object is viewed differs. The same also applies to cases where the second to fourth image capturing units 120 to 140 are respectively panned to be driven by the second to fourth roll drive units 129 to 149.

Moreover, according to the present embodiment, the example has been described in which the camera 100 includes the four image capturing units of the first to fourth image capturing units 110 to 140, but also in a case where a single image capturing unit is used, similarly as described above, when the rotation angle is different, how the change of the position of the object is viewed along with the pan drive differs.

For this reason, in a case where the rotation angle is different, when issuing an instruction to move any of the first to fourth image capturing units 110 to 140 in a desired shooting direction, the user is to operate the shooting direction while the rotation angle at the point in time is taken into account. In other words, in a case where the rotation angle is different, it is difficult for the user to intuitively operate the image capturing unit in the desired shooting direction.

In view of the above, according to the present embodiment, control is performed in a manner that even in a case where the rotation angle θ is different, how the change of the position of the object is viewed on the display screen along with the movement of the shooting direction of the image capturing unit becomes the same as the instruction operation in the desired direction by the user. That is, according to the present embodiment, the intuitive operation by the user is enabled.

Hereinafter, GUIs when the rotation angle θ is different and drive control examples of the first to fourth drive units 113 to 143 will be described with reference to FIGS. 11A and 11B, FIGS. 12A and 12B, and FIGS. 13A and 13B.

Figure 11B:
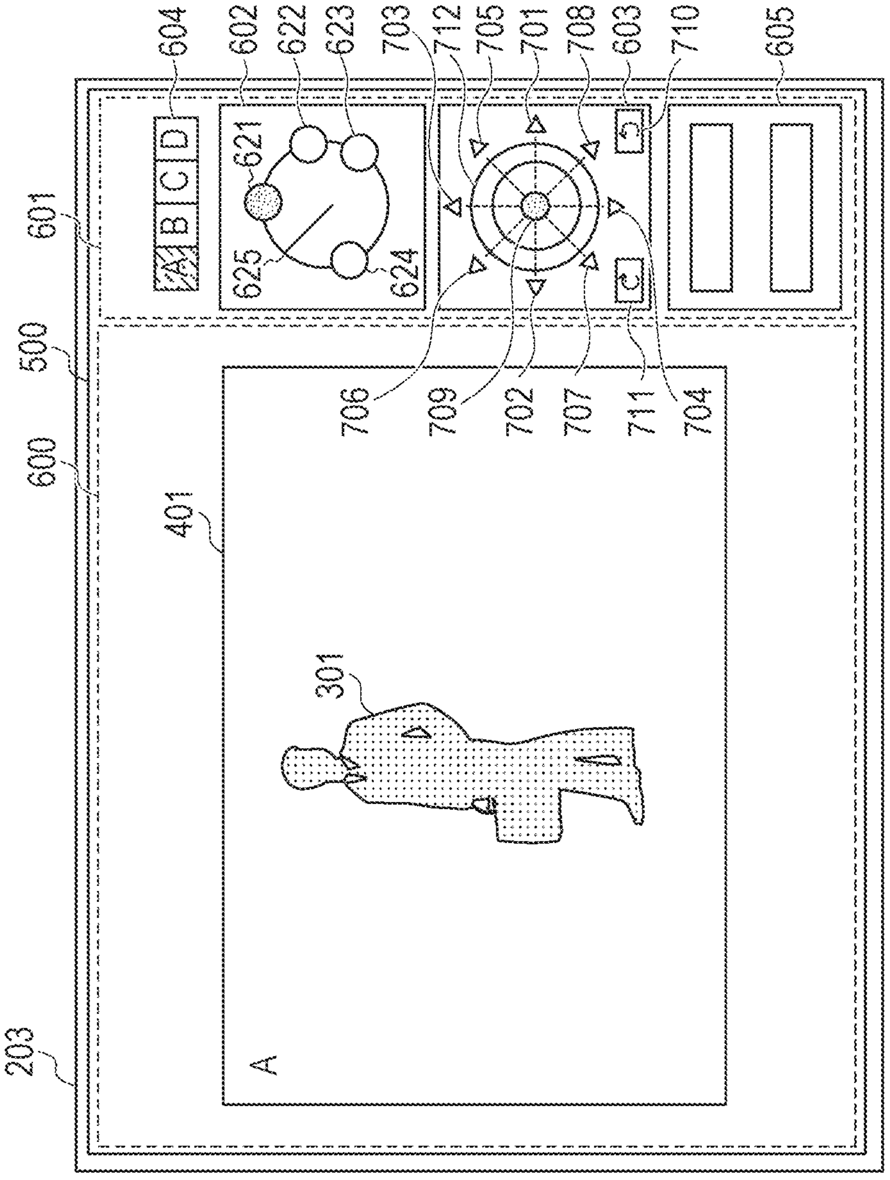
FIGS. 11A and 11B illustrate a GUI example of a rotation angle $\theta=0$ degrees.

FIG. 11B illustrates an example of a GUI 500 on the screen of the display apparatus of the client apparatus 200 that is displayed based on the OSD data generated by the image processing unit 151 of the camera 100 when the rotation angle θ is 0 degrees (θ=0). It is noted that FIG. 11B illustrates the GUI 500 displayed by the display unit 203 of the client apparatus 200, but the OSD data serving as a source of the GUI 500 is data generated by the image processing unit 151 of the camera 100 as described above. In addition, a case where the rotation angle θ is 0 degrees is such a case of the lateral shooting state as in FIG. 8A described above.

An image display region 600 and an operation region 601 are arranged on the GUI 500.

An image captured by any of the first to fourth image capturing units 110 to 140 to be developed is displayed in the image display region 600. It is noted herein that an example has been described in which the same image 401 captured by the first image capturing unit 110 as the above-described image of FIG. 9A is displayed in the image display region 600, but an image captured by any of the other second to fourth image capturing units 120 to 140 may be displayed. It is noted that a specific display example will be described below, but two or more images captured by two or more image capturing units among the first to fourth image capturing units 110 to 140 may be displayed in the image display region 600.

The operation region 601 is a region in which an operation GUI for the user of the client apparatus 200 to operate the camera 100 is displayed. For example, an image capturing unit position display UI 602, an image capturing unit operation UI 603, an image capturing unit selection UI 604, and an operation button 605 are displayed on the operation region 601.

Figure 11A:
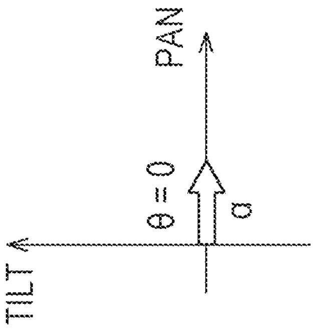

The image capturing unit selection UI 604 is a UI for selecting an image capturing unit to be subjected to an operation by the user among the first to fourth drive units 113 to 143. Buttons A to D corresponding to respective image capturing units of the first to fourth image capturing units 110 to 140 are displayed on the image capturing unit selection UI 604. For example, the button A corresponds to the first image capturing unit 110, the button B corresponds to the second image capturing unit 120, the button C corresponds to the third image capturing unit 130, and the button D corresponds to the fourth image capturing unit 140. By selecting a desired button from these the buttons A and B through a click, a touch, or the like, the user can select an image capturing unit to be subjected to the drive operation or conversely, release the image capturing unit from being subjected to the drive operation. Not only one button but also a plurality of buttons can be selected from among the buttons A to D. In a case where a plurality of buttons are selected, a plurality of image capturing units corresponding to those selected buttons are set to be subjected to the drive operation. In addition, a code corresponding to the button selected in the image capturing unit selection UI 604 may be superimposed to be displayed on the image displayed in the image display region 600. FIG. 11A exemplifies a case where only the first image capturing unit 110 is selected, and according to the present embodiment, a hatched portion represents that the button A corresponding to the first image capturing unit 110 in the image capturing unit selection UI 604 has been selected. In addition, a code "A" indicating the button A is superimposed to be displayed on the image 401 displayed in the image display region 600.

On the image capturing unit position display UI 602, symbols imitating positions of the first to fourth pan drive units 114 to 144 of the camera 100, in other words, positions of the first to fourth image capturing units 110 to 140 on the circumference 102 described with reference to FIG. 2 are displayed. On the image capturing unit position display UI 602, in a case where the positions of the first to fourth image capturing units 110 to 140 are changed by the drive of the first to fourth pan drive units 114 to 144, a position of a symbol imitating each of those image capturing units is changed. In FIG. 11A, a symbol 621 is a symbol corresponding to the first image capturing unit 110, and similarly, a symbol 622 corresponds to the second image capturing unit 120, a symbol 623 corresponds to the third image capturing unit 130, and a symbol 624 corresponds to the fourth image capturing unit 140. In addition, a symbol 625 corresponding to the drive end 106 illustrated in FIG. 2 described above is also displayed on the image capturing unit position display UI 602. Then, on the image capturing unit position display UI 602, in conjunction with a selection of an image capturing unit on the image capturing unit selection UI 604, a display state of a symbol corresponding to the selected image capturing unit is changed. Since an example is illustrated in which the first image capturing unit 110 has been selected on the image capturing unit selection UI 604, FIG. 11A illustrates an example in which the symbol 621 corresponding to the first image capturing unit 110 is changed into a display state filled with a specific color, for example, on the image capturing unit position display UI 602.

The image capturing unit operation UI 603 is a GUI for the user to instruct a movement direction when the shooting direction of the image capturing unit is to be moved while the user views the image 401 displayed in the image display region 600 captured by the image capturing unit selected on the image capturing unit selection UI 604. Pan/tilt buttons 701, 702, 703, 704, 705, 706, 707, and 708 for the user to issue an instruction to move the shooting direction of the image capturing unit while the image 401 in the image display region 600 is viewed are prepared on the image capturing unit operation UI 603. Each of the pan/tilt buttons 701 to 708 is a button having a shape such as a triangular with which a direction is made visible, and by selecting any of the pan/tilt buttons 701 to 708, the user can instruct the movement direction indicated by the shape of the button. In the case of the example of FIG. 11A, the button A corresponding to the first image capturing unit 110 is selected on the image capturing unit selection UI 604. For this reason, the image capturing unit operation UI 603 in the case of FIG. 11A serves as a GUI for the user to instruct the movement direction when moving the shooting direction of the first image capturing unit 110 while the image 401 captured by the first image capturing unit 110 to be displayed is viewed.

Among the pan/tilt buttons 701 to 708, the pan/tilt button 701 is a button to be clicked and operated when the user instructs the movement direction in which the shooting direction is moved to the right side with respect to the image 401 displayed in the image display region 600. In a case where the user clicks the pan/tilt button 701, the instruction unit 204 of the client apparatus 200 transmits the user instruction to the control unit 202, and the control unit 202 transmits the control signal based on the user instruction from the communication unit 201 to the camera 100.

The communication unit 153 of the camera 100 transmits the received control signal to the control unit 152, and the control unit 152 obtains the control signal, in other words, the control signal generated by the client apparatus 200 according to the click operation by the user on the pan/tilt button 701. In this manner, the control unit 152 has a direction obtaining function of obtaining the moving direction instructed by the user in which the shooting direction of the image capturing unit is to be moved with respect to the image 401 in the image display region 600. Then, the control unit 152 drives and controls the first drive unit 113 based on the control signal.

Herein, FIG. 11B illustrates the GUI 500 as an example in a case where the rotation angle θ of the first image capturing unit 110 is 0 degrees (θ=0). In addition, FIG. 11A illustrates a drive amount of the first drive unit 113 in a case where the pan/tilt button 701 is clicked once when the rotation angle θ of the first image capturing unit 110 is 0 degrees. That is, in a case where the pan/tilt button 701 is clicked once when the rotation angle θ of the first image capturing unit 110 is 0 degrees, the control unit 152 controls the first pan drive unit 114 to pan the shooting direction of the first image capturing unit 110 to be driven in the right direction by a predetermined amount α. According to the present embodiment, for example, α=10 degrees. It is noted that in a case where the pan/tilt button 701 is clicked when the rotation angle θ of the first image capturing unit 110 is 0 degrees, the control unit 152 does not drive the first tilt drive unit 116 (in other words, 0-degree drive in the tilt direction).

In addition, among the pan/tilt buttons 701 to 708, the pan/tilt button 702 is a button to be clicked and operated when the user instructs the movement direction in which the shooting direction is moved to the left side with respect to the image 401 displayed in the image display region 600. In a case where the user clicks the pan/tilt button 702, the client apparatus 200 transmits the control signal based on the user instruction to the camera 100, and the control unit 152 of the camera 100 drives and controls the first drive unit 113 based on the control signal. For example, in a case where the pan/tilt button 702 is clicked once when the rotation angle θ of the first image capturing unit 110 is 0 degrees, the control unit 152 controls the first pan drive unit 114 to pan and drive the shooting direction of the first image capturing unit 110 in the left direction by the predetermined amount α (10 degrees). It is noted that in a case where the pan/tilt button 702 is clicked when the rotation angle θ of the first image capturing unit 110 is 0 degrees too, the control unit 152 does not drive the first tilt drive unit 116.

In addition, among the pan/tilt buttons 701 to 708, the pan/tilt button 703 is a button to be clicked and operated when the user instructs the movement direction in which the shooting direction is moved upwards with respect to the image 401 displayed in the image display region 600. In a case where the user clicks the pan/tilt button 703, the control signal based on the user instruction is transmitted from the client apparatus 200 to the camera 100, and the control unit 152 of the camera 100 drives and controls the first drive unit 113 based on the control signal. For example, in a case where the pan/tilt button 703 is clicked once when the rotation angle θ of the first image capturing unit 110 is 0 degrees, the control unit 152 controls the first tilt drive unit 116 to tilt and drive the first image capturing unit 110 in the up direction by the predetermined amount α (10 degrees). It is noted that in a case where the pan/tilt button 703 is clicked when the rotation angle θ of the first image capturing unit 110 is 0 degrees, the control unit 152 does not drive the first pan drive unit 114.

In addition, among the pan/tilt buttons 701 to 708, the pan/tilt button 704 is a button to be clicked and operated when the user instructs the movement direction in which the shooting direction is moved downwards with respect to the image 401 displayed in the image display region 600. In a case where the user clicks the pan/tilt button 704, the control signal based on the user instruction is transmitted from the client apparatus 200 to the camera 100, and the control unit 152 of the camera 100 drives and controls the first drive unit 113 based on the control signal. For example, in a case where the pan/tilt button 704 is clicked once when the rotation angle θ of the first image capturing unit 110 is 0 degrees, the control unit 152 controls the first tilt drive unit 116 to tilt the first image capturing unit 110 to be driven in the down direction by the predetermined amount α (10 degrees). In a case where the pan/tilt button 704 is clicked when the rotation angle θ of the first image capturing unit 110 is 0 degrees too, the control unit 152 does not drive the first pan drive unit 114.

Similarly in the following, the pan/tilt button 705 is a button operated when the user instructs the movement direction in which the shooting direction is moved in a top right direction, the pan/tilt button 706 is a button operated when the user instructs the movement direction in which the shooting direction is moved in a top left direction, the pan/tilt button 707 is a button operated when the user instructs the movement direction in which the shooting direction is moved in a bottom left direction, and the pan/tilt button 708 is a button operated when the user instructs the movement direction in which the shooting direction is moved in a bottom right direction. Then, in a case where the rotation angle θ of the first image capturing unit 110 is 0 degrees, the control unit 152 controls the first drive unit 113 in a manner that the shooting direction of the first image capturing unit 110 is moved in the direction according to any clicked button of the pan/tilt buttons 705 to 708. In this manner, in a case where the shooting direction of the first image capturing unit 110 is moved in an oblique directions such as the top right direction, the top left direction, the bottom left direction, or the bottom right direction, the first pan drive unit 114 and the first tilt drive unit 116 are simultaneously, or sequentially, driven. In the case of drive in these oblique directions, the control unit 152 performs a calculation such that a drive amount of a composite vector in the pan direction and the tilt direction becomes the predetermined amount α. A calculation method for the composite vector will be described below.

It is noted that FIGS. 11A and 11B illustrate the example in which the pan/tilt buttons 701 to 708 are arranged at 45-degree intervals, but an angle at which each of the pan/tilt buttons is arranged is not limited to 45 degrees and may be a different angle interval for each of the pan/tilt buttons. In addition, in the above explanation, the example has been described in which the pan/tilt button is clicked, but for example, when the pan/tilt button is pressed and held for a while, the control unit 152 may continue driving the first pan drive unit 114 or the first tilt drive unit 116 in a drivable range in the direction. In addition, in FIGS. 11A and 11B, the description has been provided with the examples of the first image capturing unit 110 and the first drive unit 113, but in a case where any of the second to fourth image capturing units 120 to 140 is selected on the image capturing unit selection UI 604, the control unit 152 similarly controls the selected image capturing unit and the drive unit.

A joystick button 709 is a button dragged to be operated when the user instructs the movement direction in which the shooting direction is moved in any direction with respect to the image 401 captured by the image capturing unit selected on the image capturing unit selection UI 604 and displayed in the image display region 600. The joystick button 709 is displayed in a symbol 712 that imitates a controller to which a so-called joystick is mounted. In a case where the rotation angle θ is 0 degrees, when the joystick button 709 is dragged to be operated in the right direction (direction of the pan/tilt button 701), the control unit 152 of the camera 100 performs the drive control similar to that in a case where the pan/tilt button 701 described above is operated. In a case where the joystick button 709 is operated in the left direction, the up direction, the down direction, the top right direction, the top left direction, the bottom left direction, or the bottom right direction too, the control unit 152 performs the drive control similar to that in a case where the corresponding one of the pan/tilt buttons 702 to 708 described above is operated. It is noted that in the case of the joystick button 709, the drive control in directions other than the eight directions indicated by the pan/tilt buttons 701 to 708 can also be performed. In addition, in a case where the joystick button 709 is not operated, the joystick button 709 is located at a center of the symbol 712, and at this time, the drive control by the control unit 152 of the camera 100 is not performed.

In addition, the control unit 202 of the client apparatus 200 may transmit a control signal according to an operation amount of the joystick button 709 from the center of the symbol 712 to the camera 100. In this case, the control unit 152 of the camera 100 may change a drive speed of the drive unit (the pan drive unit and the tilt drive unit) according to the operation amount of the joystick button 709 from the center of the symbol 712. In addition, with regard to a position of the joystick button 709, the position in the symbol 712 may be changed in conjunction with click operations on the pan/tilt buttons 701 to 708.

A rotation button 710 is a button to be clicked and operated when the user rotates and drives the rotation drive unit corresponding to the image capturing unit selected on the image capturing unit selection UI 604 in the + direction. In a case where a click operation is performed once on the rotation button 710, for example, the rotation drive unit changes the rotation angle by +15 degrees each. On the other hand, a rotation button 711 is a button to rotate and drive the rotation drive unit in the − direction, and for example, according to the click operation performed once, the rotation drive unit changes the rotation angle by −15 degrees each.

The operation button 605 includes a menu button for calling up other setting screens, a recording button for starting recording, a display change button, or the like. The display change button includes a display rotation button according to a second embodiment that will be described below, a multiple image display button according to a third embodiment that will be described below, or the like.

Figure 12B:
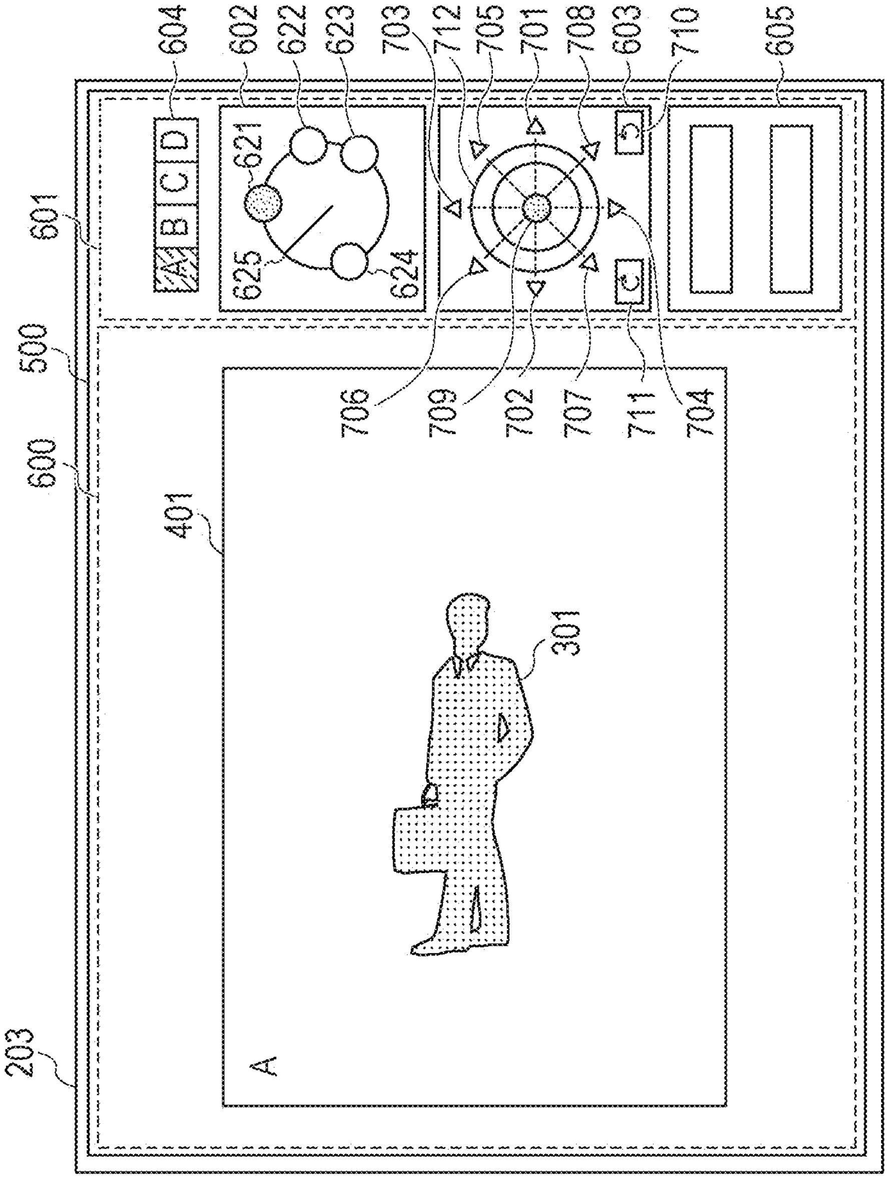
FIGS. 12A and 12B illustrate a GUI example of the rotation angle $\theta=+90$ degrees.
Figure 12A:
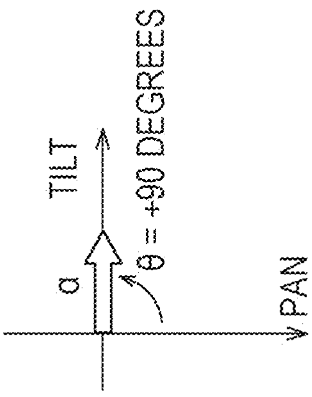

FIG. 12B illustrates an example of the GUI 500 that is displayed on the display apparatus of the client apparatus 200 based on the OSD data generated by the image processing unit 151 of the camera 100 when the rotation angle θ is +90 degrees (θ=+90). Similarly as in FIG. 11B, FIG. 12B illustrates the GUI 500 to be displayed on the display apparatus of the client apparatus 200, but the OSD data serving as a source of the GUI 500 is data generated by the image processing unit 151 of the camera 100. In addition, a case where the rotation angle θ is +90 degrees is a case of the lateral shooting state as in FIG. 8B described above. It is noted that in FIG. 12B too, the description is provided with an example in which the first image capturing unit 110 is selected on the image capturing unit selection UI 604 through the selection of the button A. In addition, FIG. 12A represents a situation where the shaft of the first pan drive unit 114 and the shaft of the first tilt drive unit 116 are subjected to +90-degree rotation according to the rotation drive of the first rotation drive unit 117.

Herein, when the rotation angle θ is +90 degrees, for example, in a case where the first pan drive unit 114 of the first image capturing unit 110 is moved in the right (+) direction, as described with reference to FIG. 10B, the shooting direction of the first image capturing unit 110 is moved in the + direction of the X axis (down direction on paper). Then, in this case, the image in the image display region 600 is displayed in a manner that the object 301 is moved in the up direction. For this reason, in a case where the pan/tilt button in the image capturing unit operation UI 603 is set as a button representing the drive directions of the pan drive unit and the tilt drive unit, depending on the rotation angle, the movement direction instructed by the pan/tilt button and the movement direction of the image in the image display region 600 differ. That is, in a case where it is expected that the user performs the operation while the display image in the image display region 600 is viewed, the user is to select the pan/tilt button by taking into account the current rotation angle and the drive directions of the pan drive unit and the tilt drive unit. Therefore, it becomes difficult for the user to perform the intuitive operation while the display image in the image display region 600 is viewed.

For this reason, according to the present embodiment, the image capturing unit operation UI 603 of the GUI 500 serves as a GUI for the user to instruct the movement direction when the shooting direction of the image capturing unit is moved with respect to the display image in the image display region 600. Then, the control unit 152 of the camera 100 performs the drive control on the pan drive unit and the tilt drive unit based on the rotation angle while the image on the image capturing unit operation UI 603 is viewed in a manner that the shooting direction of the image capturing unit is moved in the same direction as the movement direction instructed by the user.

To realize the drive control on the pan drive unit and the tilt drive unit as described above, first, the control unit 152 obtains the rotation angle θ by the rotation drive unit corresponding to the image capturing unit selected on the image capturing unit selection UI 604. That is, the control unit 152 performs angle obtaining processing of obtaining a rotation angle of the image with respect to the image display region 600 of the GUI 500 on the display screen. It is noted that the description is provided with an example of a case where the first image capturing unit 110 is selected on the image capturing unit selection UI 604. In this case, as the angle obtaining processing, the control unit 152 obtains a rotation angle θ of the first image capturing element 112 by the first rotation drive unit 117.

Then, the control unit 152 controls the first drive unit 113 based on the rotation angle θ in a manner that the shooting direction of the first image capturing unit 110 is moved in the same direction as the movement direction instructed by the user through the selection of the pan/tilt button 701. That is, the control unit 152 drives and controls at least one of the first pan drive unit 114 and the first tilt drive unit 116 in a manner that the shooting direction of the first image capturing unit 110 is moved in the same direction as the direction indicated by the pan/tilt button 701 selected by the user.

For example, in a case where the pan/tilt button 701 is selected when the rotation angle θ is 0 degrees, the control unit 152 pans and drives the first pan drive unit 114 in the right direction in a manner that the shooting direction of the first image capturing unit 110 is moved in the right direction similarly as described with reference to FIGS. 11A and 11B. In addition, at this time, the control unit 152 performs the control so as not to drive the first tilt drive unit 116.

In addition, for example, in a case where the pan/tilt button 701 is selected when the rotation angle θ is +90 degrees, the control unit 152 performs such control that instead of the first pan drive unit 114, the first tilt drive unit 116 is driven in the up (+) direction by the drive amount α. According to this, the shooting direction of the first image capturing unit 110 is moved in the right (+) direction, and an image on the right side with respect to the image 401 is displayed in the image display region 600 of FIG. 12B. That is, the user can intuitively perform the operation without being conscious about the rotation angle.

In addition, for example, in a case where the pan/tilt button 702 is selected when the rotation angle θ is +90 degrees, the control unit 152 performs the control to drive the first tilt drive unit 116 in the down (−) direction by the drive amount α. In this case, the shooting direction of the first image capturing unit 110 is moved in the left (−) direction with respect to the display image in the image display region 600. According to this, an image on the left (−) side with respect to the image 401 is displayed in the image display region 600 of FIG. 12B, which matches the movement direction in the left side that has been instructed by the user through the selection of the pan/tilt button 702.

Figure 13A:
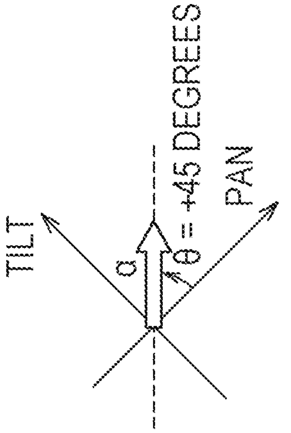
FIGS. 13A and 13B illustrate a GUI example of the rotation angle $\theta=+45$ degrees.
Figure 13B:
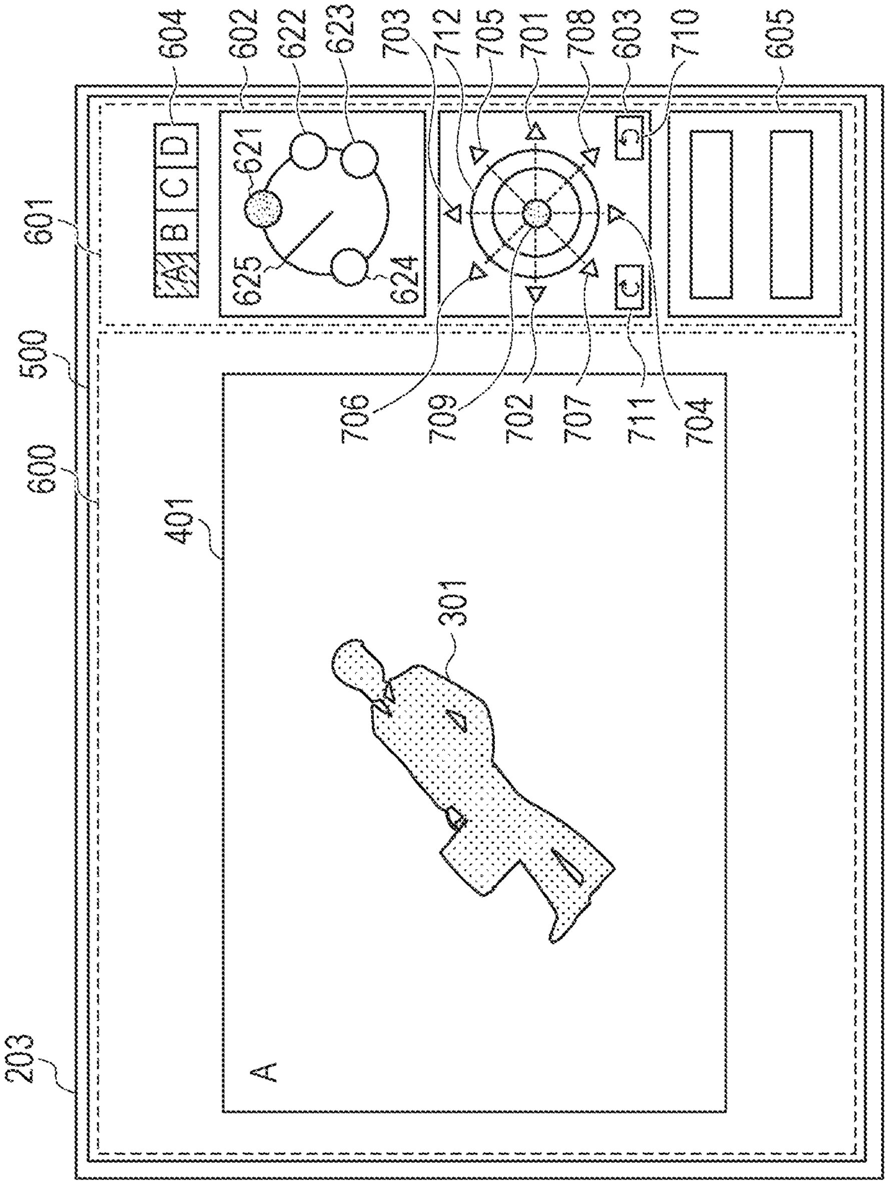

FIG. 13B illustrates an example of the GUI 500 displayed on the display apparatus of the client apparatus 200 based on the OSD data generated by the image processing unit 151 of the camera 100 when the rotation angle θ is +45 degrees (θ=+45). It is noted that in the example of FIG. 13B too, an example is described in which the first image capturing unit 110 is selected through the selection of the button A on the image capturing unit selection UI 604. FIG. 13A represents a situation where the shaft of the first pan drive unit 114 and the shaft of the first tilt drive unit 116 are rotated by the rotation drive of the first rotation drive unit 117 by +45 degrees.

In a case where the pan/tilt button 701 is selected when the rotation angle θ is +45 degrees, the control unit 152 drives and controls the first drive unit 113 in a manner that the shooting direction of the first image capturing unit 110 is moved in the right direction with respect to the image 401 in the image display region 600. The control unit 152 at this time performs the drive and control in a manner that the composite vector of the pan direction by the first pan drive unit 114 and the tilt direction by the first tilt drive unit 116 becomes the drive amount α. According to this, the shooting direction of the first image capturing unit 110 is moved in the right (+) direction, and an image on the right (+) side with respect to the image 401 is displayed in the image display region 600 of FIG. 13B.

In this manner, the control unit 152 of the camera 100 changes the drive or drive ratio of the first pan drive unit 114 and the first tilt drive unit 116 that are controlled according to the operation of the pan/tilt button based on the rotation angle of the first rotation drive unit 117. According to this, while viewing the displayed image, the user can intuitively perform the change instruction (operation) of the movement direction in which the shooting direction of the image capturing unit is moved without being conscious about the rotation angle of the rotation drive unit.

Figure 14:
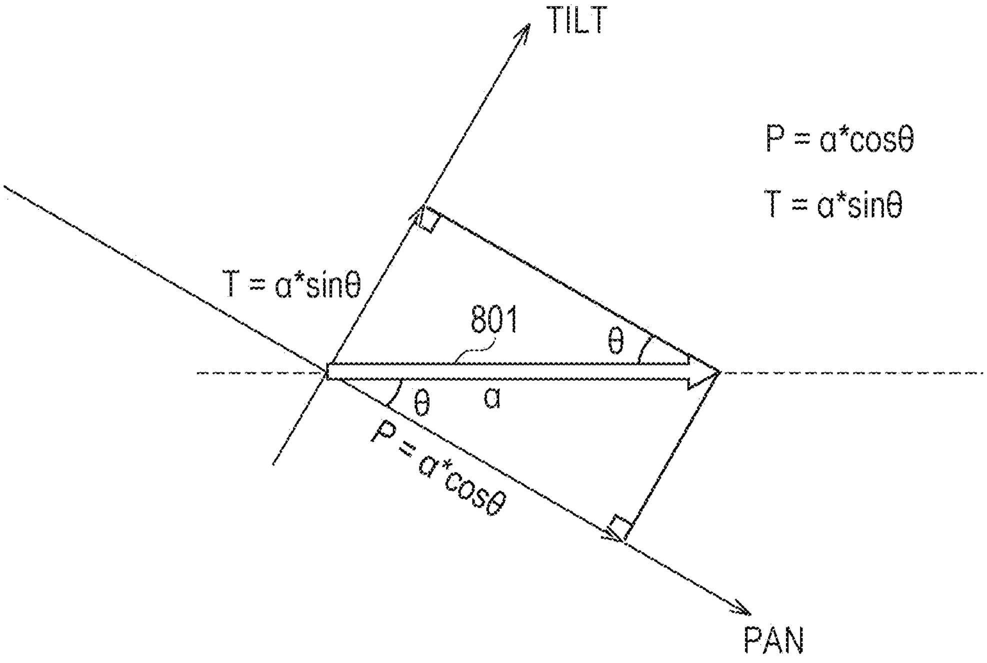
FIG. 14 is a diagram illustrating a composite vector.

FIG. 14 is a diagram used to explain the calculation method for the above-described composite vector.

In FIG. 14, the description will be provided with the example of a case where the pan/tilt button 701 is operated, but the composite vector can be calculated similarly also in a case where the pan/tilt buttons indicating the other directions are operated. In FIG. 14 too, the description will be provided with the example of the selection of the first image capturing unit 110 on the image capturing unit selection UI 604.

A ratio of the drive amounts of the first pan drive unit 114 to the first tilt drive unit 116 in the first drive unit 113 corresponding to the first image capturing unit 110 can be calculated based on the rotation angle θ and a drive amount α indicating a magnitude of a composite vector 801. When a pan drive amount of the first pan drive unit 114 is set as P and a tilt drive amount of the first tilt drive unit 116 is set as T, the pan drive amount P and the tilt drive amount T are expressed by the following Expression (1) and Expression (2) using trigonometric functions.

$$P = \alpha * \cos\theta \quad (1)$$

$$T = \alpha * \sin\theta \quad (2)$$

By driving the first pan drive unit 114 by the pan drive amount P and driving the first tilt drive unit 116 by the tilt drive amount T, the shooting direction of the first image capturing unit 110 can be controlled in the direction of the composite vector 801 and the drive amount.

It is noted that in the above-described example, the pan drive amount P and the tilt drive amount T are calculated from the composite vector 801, but when the movement direction by the user instruction and the movement direction with respect to the image 401 match, the user can perform the intuitive operation. For this reason, it is sufficient when the same result is obtained as a ratio calculated based on Expression (1) and Expression (2), and for example, Expression (1) and Expression (2) may be multiplied with the same coefficient. In addition, in actuality, since there are limits (such as a minimum number for a setting of the drive amount and a setting interval) on the drive control for with regard to the first drive unit 113 (the first pan drive unit 114 and the first tilt drive unit 116), the control is preferably performed through an adjustment to the nearest drive amount within a range in which the drive control can be performed.

Figure 15:
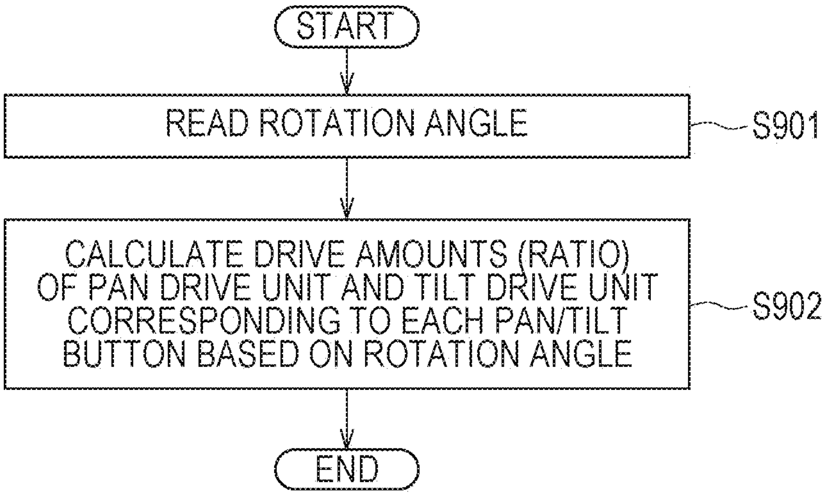
FIG. 15 illustrates a flowchart of pan/tilt control according to the rotation angle.

FIG. 15 is a flowchart of control processing in which the control unit 152 performs the above-described control.

The control unit 152 performs processing in the flowchart in FIG. 15 in a case where a change instruction of the rotation angle is included in the control signal transmitted from the client apparatus 200.

First, as processing in step S901, the control unit 152 obtains a control signal transmitted from the client apparatus 200. The control unit 152 determines whether the change instruction of the rotation angle of the image capturing element instructed by the user instruction is included in the control signal, and in a case where the change instruction is included, information of the rotation angle is read.

Next, as processing in step S902, the control unit 152 calculates, based on the read rotation angle and operation information of each pan/tilt button included in the control signal, drive amounts (ratio) of the pan drive unit and the tilt drive unit according to the operation information of the pan/tilt button. The drive amounts (ratio) at this time may be calculated based on the composite vector at any time as described above or may be read from a previously calculated table. Then, the control unit 152 drives and controls the pan drive unit and the tilt drive unit according to the calculated drive amounts (ratio) of the pan drive unit and the tilt drive unit.

Supplement of Pan/Tilt Button

According to the present embodiment, without depending on the rotation angle, since it is sufficient when the movement direction of the shooting direction of the image capturing unit becomes the same direction as the movement direction by the user instruction on the GUI 500, a type or a shape of a UI is not limited to the pan/tilt button, and various types and shapes may be adopted. For example, a button on which right +30 degrees (corresponding to the pan/tilt button 701) is labelled, the joystick button 709, a drive amount selection button that will be described below, and the like may be adopted. In addition, the pan/tilt button may be a symbol such as a triangle or an arrow with which a direction may be recognized or a character such as "left", "right", "up", or "down" with which a direction may be recognized, and in this case, there is a possibility that the user can perform more intuitive operation. In addition, for example, a button indicating a direction on a right side with respect to the display image is arranged on the right side, or the like, by linking the arrangement of the button with the movement direction, the user may be able to perform the intuitive operation.

Drive Amount Selection Button

Figure 16:
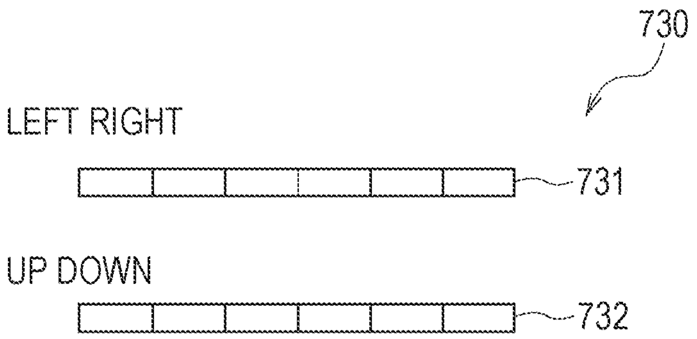
FIG. 16 illustrates an example of a drive amount selection button.

FIG. 16 illustrates an example of a drive amount selection button 730.

The drive amount selection button 730 is displayed, for example, in the operation region 601 as an UI. FIG. 16 illustrates a left and right drive amount selection button 731 and an up and down drive amount selection button 732 as an example of the drive amount selection button 730. The left and right drive amount selection button 731 includes six buttons that are buttons for operating a current pan drive position by the pan drive unit by a pan drive amount of −30 degrees, −20 degrees, −10 degrees, +10 degrees, +20 degrees, and +30 degrees from a left end. In a case where the button of −30 degrees in the left and right drive amount selection button 731 is selected, the pan drive unit changes the pan drive position in the left (−) direction by 30 degrees, and in a case where the button of +30 degrees is selected, the pan drive unit changes the pan drive position in the right (+) direction by 30 degrees. The up and down drive amount selection button 732 similarly includes six buttons that are buttons for operating a current tilt drive position by the tilt drive unit by a tilt drive amount of −30 degrees, −20 degrees, −10 degrees, +10 degrees, +20 degrees, and +30 degrees from the left end. In a case where the button of −30 degrees in the up and down drive amount selection button 732 is selected, the tilt drive unit changes the tilt drive position in the down (−) direction by 30 degrees, and in a case where the button of +30 degrees is selected, the tilt drive unit changes the tilt drive position in the up (+) direction by 30 degrees.

The control unit 152 of the present embodiment described above can also treat such a drive amount selection button 730 similarly as in the pan/tilt button described above. For example, a third button (+10 degrees) from the right of the left and right drive amount selection button 731 is similarly treated as in the pan/tilt button 701, and in a case where the third button is selected, the drive amount is decided to be tripled (3*a) as 30 degrees.

A button for driving the pan drive unit along and a UI for driving the tilt drive unit alone may be separately provided in addition to the pan/tilt buttons 701 to 708 and the drive amount selection button 730. In a case where these buttons are operated, the movement direction of the shooting direction with respect the display image differs depending on the rotation angle. For this reason, in a case where these UIs are used, by separating a region in the operation region 601 with the image capturing unit operation UI 603 described above or the like, it is preferably set that those UIs are not to be operated at the same time. In addition, the camera 100 may hold two different modes such that the user can set a mode switching on whether the user desires to designate the movement direction with respect to the display image or whether the user desires to designate the drive unit.

In addition, according to the present embodiment, the movement direction of the shooting direction with respect the display image is a direction indicated by the pan/tilt buttons 701 to 708 but is not limited to this. For example, instead of the movement direction of the shooting direction with respect the display image, a direction in which the object moves in the screen may be used. In the case of the movement direction of the object in the screen, the direction indicated by the pan/tilt buttons 701 to 708 is a direction (180-degree rotation) opposite to the case of the movement direction of the shooting direction with respect the display image. That is, an UI such as the pan/tilt button for the user to instruct the movement direction of the shooting direction with respect the display image and an UI for indicating the movement direction of the object depicted in the image are UIs indicating opposite directions.

Second Embodiment

According to the first embodiment, the example in which the image capturing element (or the image capturing unit) is rotated to be driven by the rotation drive unit has been described. In contrast, according to the second embodiment, an example of a case where not only the rotation drive of the image capturing element (or the image capturing unit) is performed but also the rotation drive is performed by rotating the display image about an image center thereof that is used as a rotation axis.

FIGS. 17A and 17B and FIGS. 18A and 18B illustrate rotation examples in which the image in the image display region 600 are rotated about the center of the image on the GUI 500 similar to those of FIGS. 11A and 11B to FIGS. 13A and 13B described above. In FIGS. 17A and 17B and FIGS. 18A and 18B too, the description will be provided with an example in which the first image capturing unit 110 is selected on the image capturing unit selection UI 604.

As in the second embodiment, in a case where the image 401 in the image display region 600 is to be rotated, the user operates a display rotation button, which is not illustrated in the drawing, provided in the operation button 605. Then, the client apparatus 200 transmits a control signal including operation information according to the user instruction to the camera 100. Although the display rotation button is not illustrated in the drawing, as a rotation angle for rotating the display image, for example, eight buttons or the like for designating the rotation angle in 45-degree increments similarly as in the pan/tilt buttons 701 to 708 may be used. In addition, for example, instead of the display rotation button, a text box or the like in which the rotation angle of the display image is to be entered as a numeric value.

The control unit 152 of the camera 100 causes the image processing unit 151 to perform image processing of rotating the image based on the control signal including the operation information of the rotation angle selected by the user instruction through the operation button 605. Then, the rotated image is transmitted to the client apparatus 200, so that the rotated image 401 is displayed in the image display region 600 of the GUI 500.

A case where a rotation angle φ of the display image is +90 degrees (φ=+90 degrees) will be described with reference to FIGS. 17A and 17B. Herein, the description will be provided where the rotation angle θ by the rotation drive unit and the rotation angle φ of the display image are used, but θ and φ are values in the same dimension and can be added up. A sum of the rotation angle θ by the rotation drive unit and the rotation angle φ of the display image is a rotation angle ψ according to the second embodiment, which can be represented by Expression (3). It is noted that in the case of the first embodiment, since the rotation angle φ of the display image is 0 degrees (φ=0 degrees), the combined rotation angle ψ is the same as the rotation angle θ by the rotation drive unit (ψ=0).

$$\theta + \varphi = \psi \tag{3}$$

Figure 17B:
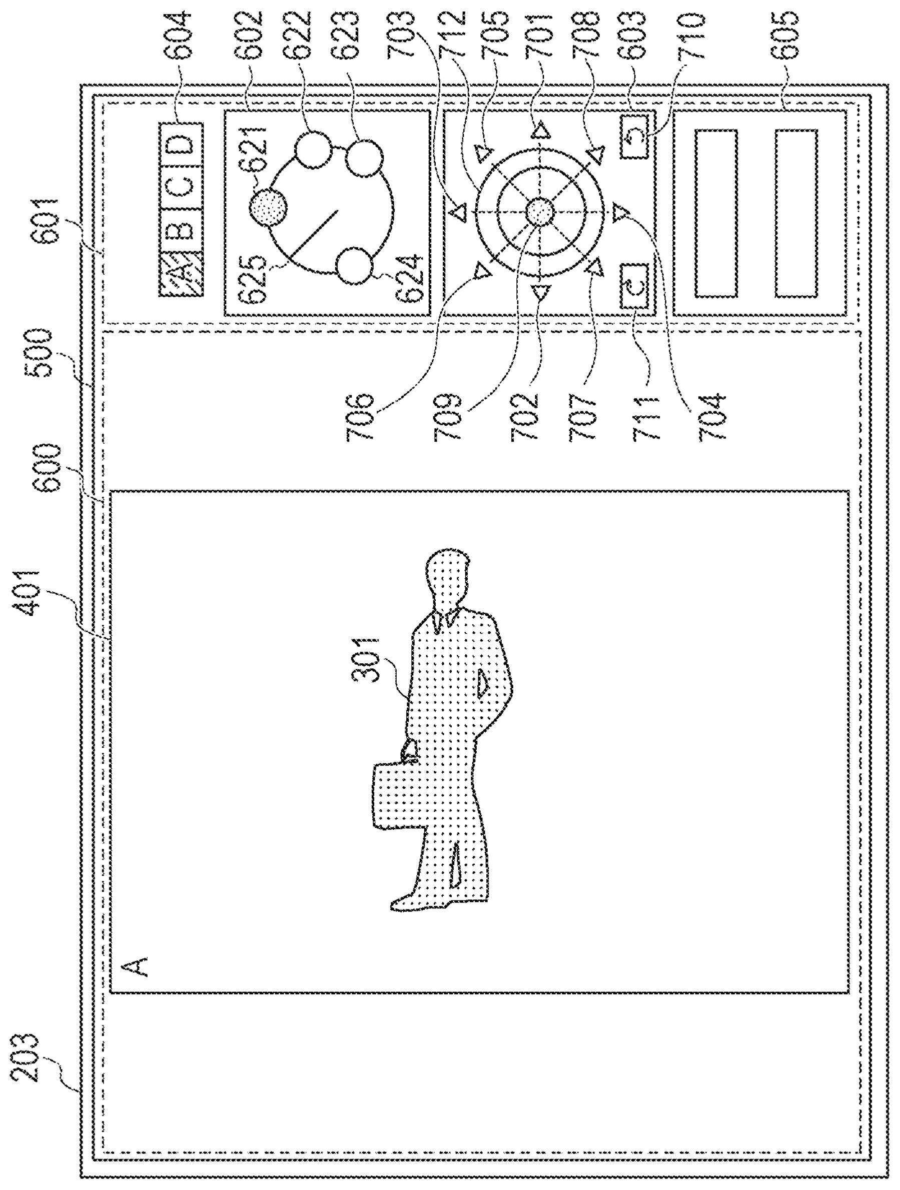
FIGS. 17A and 17B illustrate a GUI example of a rotation angle $\varphi=+90$ degrees.
Figure 17A:
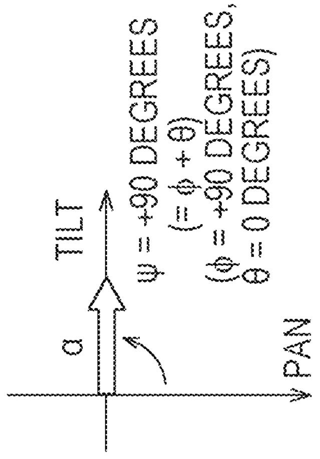

FIGS. 17A and 17B illustrate a situation where the image 401 is subjected to clockwise 90-degree rotation (is rotated) with respect to the above-described example of FIGS. 11A and 11B, and it may be found out that the image 401 is in the longitudinally long state with respect to the horizontal direction. The rotation angle φ at this time is set as +90 degrees. It is noted that the rotation angle θ by the rotation drive unit is set as 0 degrees. For this reason, the combined rotation angle ψ becomes +90 degrees. In addition, the combined rotation angle ψ in this example of FIGS. 17A and 17B matches the rotation angle θ in FIGS. 12A and 12B (θ=ψ=+90 degrees). That is, as illustrated in FIGS. 17A and 17B, the object 301 depicted in the image 401 is inclined by +90 degrees similarly as in the case of the example of FIGS. 12A and 12B. For this reason, also in a case where the pan/tilt button 701 is selected on the GUI 500 of FIGS. 17A and 17B, for example, the control unit 152 may perform the same control on the pan drive unit and the tilt drive unit as that in a case where the pan/tilt button 701 is selected in the above-described example of FIGS. 12A and 12B.

Figure 18B:
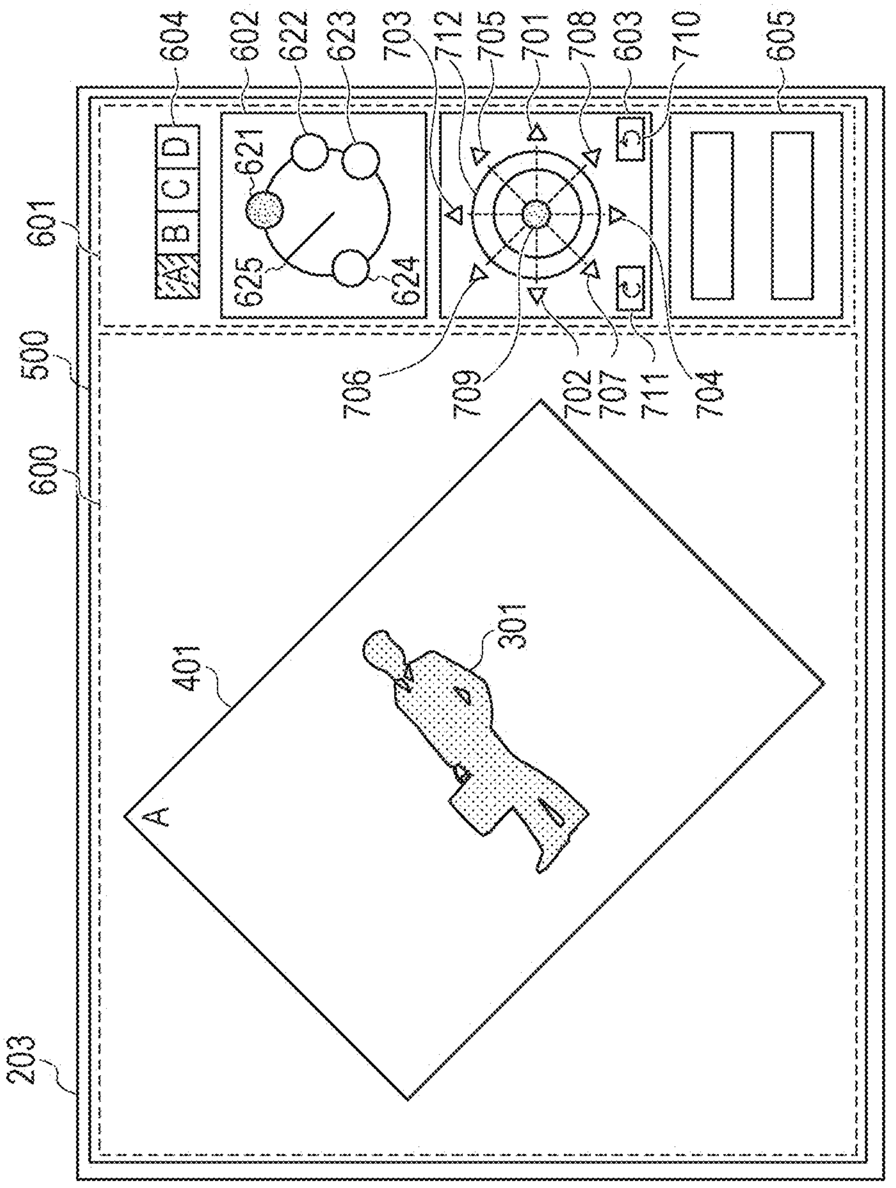
FIGS. 18A and 18B illustrate a GUI example of the rotation angle $\varphi=+45$ degrees.
Figure 18A:
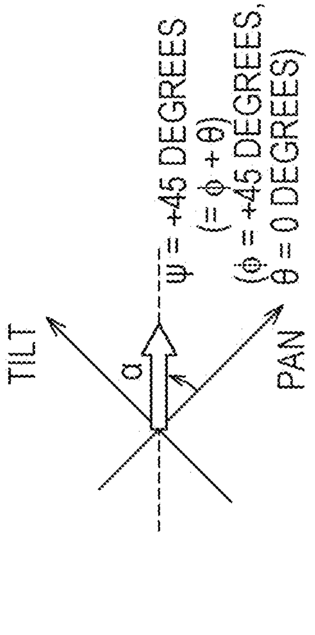

Next, a case where the rotation angle φ of the display image is +45 degrees (φ=+45 degrees) will be described with reference to FIGS. 18A and 18B. That is, FIGS. 18A and 18B illustrate a situation where the image 401 is subjected to clockwise 90-degree rotation (is rotated) with respect to the above-described example of FIGS. 11A and 11B, and it may be found out that the image 401 is inclined. At this time, the combined rotation angle ψ in FIGS. 18A and 18B matches the rotation angle θ in FIGS. 13A and 13B (θ=ψ=+45 degrees). That is, as illustrated in FIGS. 18A and 18B, the object 301 depicted in the image 401 has an inclination of the rotation similar to that of the example in FIGS. 13A and 13B. For this reason, in the example of the GUI 500 of FIGS. 18A and 18B, the control unit 152 may perform the same control on the pan drive unit and the tilt drive unit as that in the above-described example of FIGS. 13A and 13B.

Figure 19B:
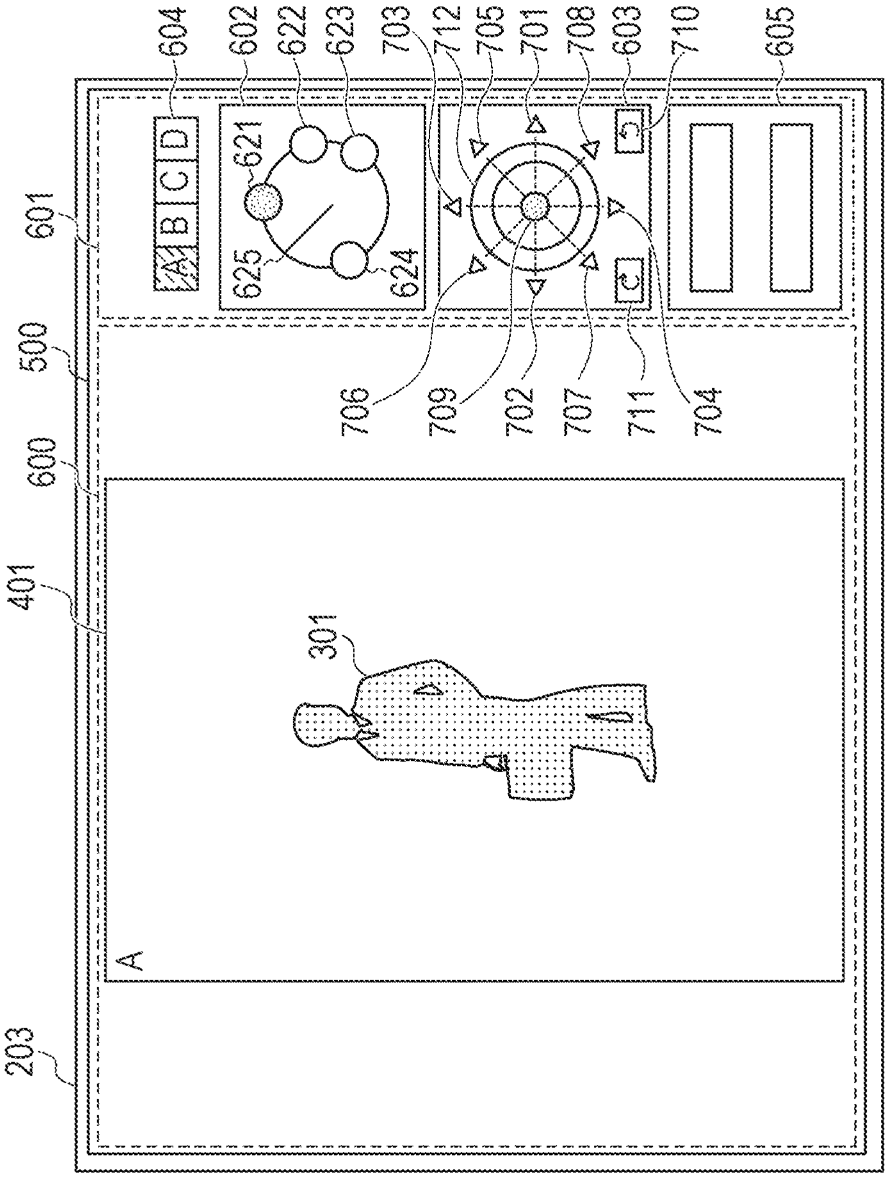
FIGS. 19A and 19B illustrate a GUI example of the rotation angle $\varphi=+90$ degrees and $\theta=-90$ degrees.
Figure 19A:
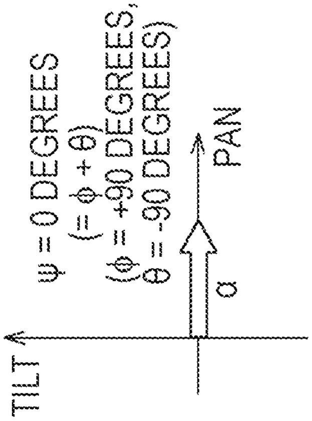

Next, a case where the rotation angle θ by the rotation drive unit and the rotation angle φ of the display image are combined with each other as in the first embodiment will be described with reference to FIGS. 19A and 19B. The example of FIGS. 19A and 19B illustrates a state in which the rotation angle θ of the rotation drive unit is driven by −90 degrees from a state in which the rotation angle φ of the display image is +90 degrees and the rotation angle θ by the rotation drive unit is 0 degrees. In this case, the image 401 turns into a longitudinally long image with respect to the horizontal direction, and the object 301 in the image is put into an upright state. In addition, the combined rotation angle ψ at this time becomes 0 degrees and matches the rotation angle θ illustrated in FIGS. 11A and 11B (θ=ψ=0 degrees). That is, the combined rotation angle ψ in the case of FIGS. 19A and 19B becomes a rotation angle similar to that of the example in FIGS. 11A and 11B. Therefore, it may be found that in the case of this example, the control unit 152 may perform control similar to the control on the drive unit illustrated in FIGS. 11A and 11B.

As may be found out from FIGS. 17A and 17B, FIGS. 18A and 18B, and FIGS. 19A and 19B, in the case of the second embodiment, it is possible to perform control similar to the example of the first embodiment based on the combined rotation angle obtained from the rotation angle of the display image and the rotation angle by the rotation drive unit. That is, according to the second embodiment too, irrespective of the rotation angle of the display image, while the display image is viewed, the user can intuitively perform the change instruction (operation) of the movement direction of the display image.

It is noted that in a case where the display of the image is subjected to a mirror inversion (left and right inversion only or up and down inversion only), for example, the drive direction (composite vector to be calculated) is also preferably inverted. According to this, the user can intuitively perform the operation without being conscious about the mirror inversion or the rotation.

It is noted that according to the second embodiment, as processing in step S901 of the flowchart in FIG. 15, the control unit 152 obtains a control signal transmitted from the client apparatus 200. The control unit 152 determines whether a change instruction of the rotation angle or a change instruction of the rotation angle of the display image is included in the user instruction of the control signal. Then, in a case where the change instruction is included, the control unit 152 reads information of the rotation angle.

Next, as processing in step S902, the control unit 152 calculates the drive amounts (ratio) of the pan drive unit and the tilt drive unit according to the operation information of the pan/tilt button based on the read rotation angle and the operation information of each of the pan/tilt buttons included in the control signal. The drive amounts (ratio) at this time may be calculated based on the composite vector at any time as described above or may be read out from a previously calculated table. Then, the control unit 152 drives and controls the pan drive unit and the tilt drive unit according to the calculated drive amounts (ratio) of the pan drive unit and the tilt drive unit.

Third Embodiment

Next, according to the third embodiment, a case where the user has selected a plurality of image capturing units will be described.

Figure 20:
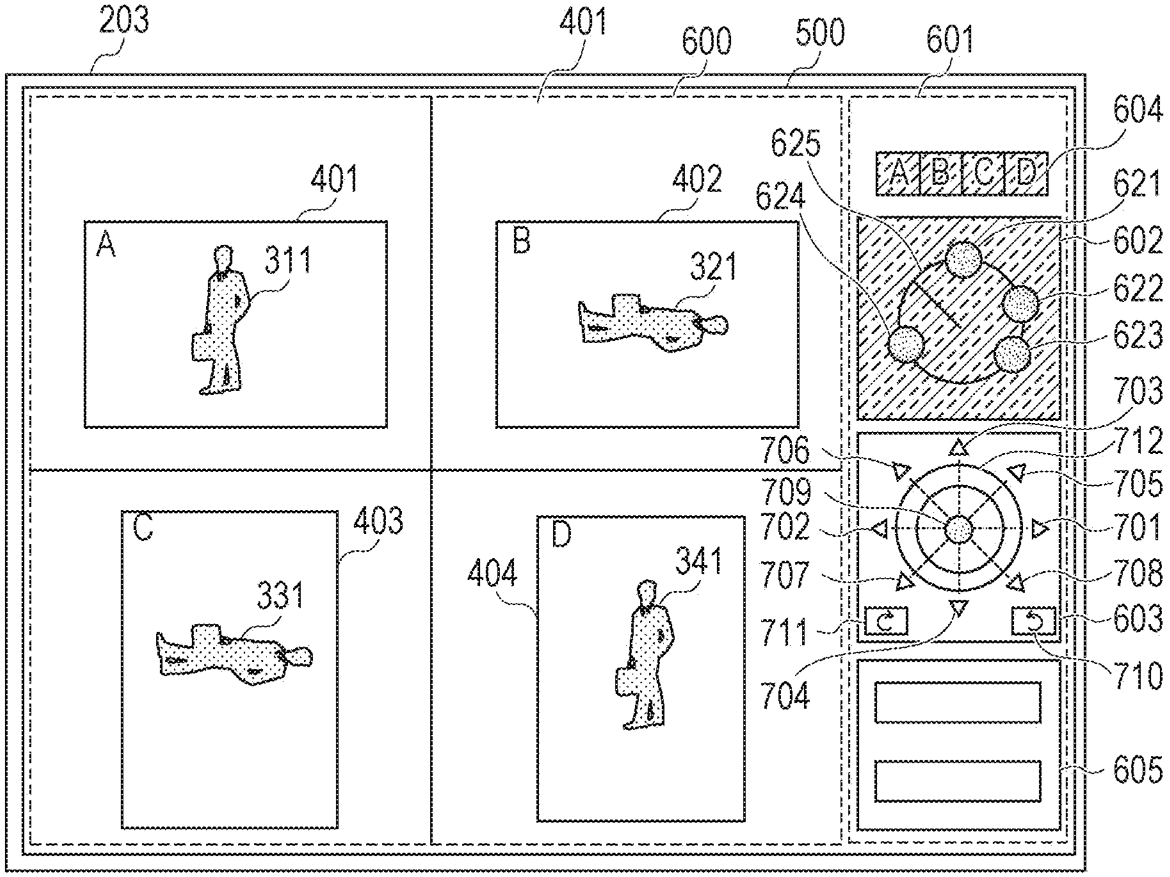
FIG. 20 illustrates a GUI example when a plurality of image capturing units are selected.

FIG. 20 illustrates the GUI 500 in a case where the user has selected all the buttons A to D on the image capturing unit selection UI 604, in other words, a case where all of the first to fourth image capturing units 110 to 140 have been selected.

The user can select a plurality of image capturing units through an operation on the image capturing unit selection UI 604 and can further instruct, for example, display of a plurality of images in the image display region 600 by selecting the multiple image display button, which is not illustrated in the drawing, provided in the operation button 605. In this manner, in a case where the user selects a plurality of image capturing units through the image capturing unit selection UI 604 and furthermore, the display of the plurality of images is instructed by the multiple image display button, a control signal including information of those selection and instruction is transmitted from the client apparatus 200 to the camera 100.

The control unit 152 of the camera 100 causes the image processing unit 151 to perform image processing of generating an image in which a plurality of images captured by a plurality of image capturing units are arranged based on the control signal including the selection of the plurality of image capturing units and the instruction for the display of the plurality of images. As an arrangement example of the plurality of image, as described above, the images are expected to be arranged longitudinally and laterally or arranged in a single row or column, for example. Then, the plurality of images arranged by the image processing unit 151 are transmitted from the camera 100 to the client apparatus 200 to be displayed.

FIG. 20 illustrates an example of the GUI 500 in which four images 401 to 404 captured to be displayed by the first to fourth image capturing units 110 to 140 are arranged longitudinally and laterally in the image display region 600. It is assumed that the image 401 is an image captured by the first image capturing unit 110, the image 402 is an image captured by the second image capturing unit 120, the image 403 is an image captured by the third image capturing unit 130, and the image 404 is an image captured by the fourth image capturing unit 140. Codes "A" to "D" corresponding to the respective buttons selected by the image capturing unit selection UI 604 are respectively superimposed to be displayed on the four images 401 to 404 captured by the first to fourth image capturing units 110 to 140. According to this, the user can recognize to which one of the first to fourth image capturing units 110 to 140 the images 401 to 404 displayed in the image display region 600 correspond.

In addition, it is assumed that each of the first to fourth image capturing units 110 to 140 has a different shooting direction, and each of the first to fourth image capturing units 110 to 140 or display images has a different rotation angle. It is noted that each of an object 311 in the image 401 displayed in the image display region 600, an object 321 in the image 402, an object 331 in the image 403, and an object 341 in the image 404 is a different object, but to simplify the illustration in the drawing, the same object is illustrated for convenience.

It is noted that in the case of the example of FIG. 20, the rotation angle (ψ=φ+θ) of the first image capturing unit 110 is set to be in the same state as the example of FIGS. 11A and 11B described above. The rotation angle (ψ=φ+θ) of the second image capturing unit 120 is set to be in the same state as the example of FIGS. 12A and 12B. The rotation angle (ψ=φ+θ) of the third image capturing unit 130 is set to be in the same state as the example of FIGS. 17A and 17B. The rotation angle (ψ=φ+θ) of the fourth image capturing unit 140 is set to be in the same state as the example of FIGS. 19A and 19B.

Herein, it is assumed that the user selects, for example, the pan/tilt button 701, and a control signal corresponding to the selection is transmitted to the camera 100. In this case, the control unit 152 of the camera 100 performs the pan/tilt drive control on the first to fourth drive units 113 to 143 as described above based on the rotation angle (ψ=φ+θ) of each of the first to fourth image capturing units 110 to 140. That is, the control unit 152 performs the pan/tilt drive control on the first drive unit 113 corresponding to the first image capturing unit 110 in a similar way as described with reference to FIGS. 11A and 11B. In addition, the control unit 152 performs the pan/tilt drive control on the second drive unit 123 corresponding to the second image capturing unit 120 in a similar way as described with reference to FIGS. 12A and 12B. Similarly, the control unit 152 performs the pan/tilt drive control on the third drive unit 133 corresponding to the third image capturing unit 130 in a similar way as described with reference to FIGS. 17A and 17B. Similarly, the control unit 152 performs the pan/tilt drive control on the fourth drive unit 143 corresponding to the fourth image capturing unit 140 in a similar way as described with reference to FIGS. 19A and 19B.

In this manner, according to the third embodiment, even in a case where a plurality of image capturing units are selected, while viewing the displayed image, the user can intuitively perform the change instruction (operation) of the shooting direction of each of the image capturing units.

It is noted that in FIG. 20, since the symbols of all the image capturing units in the image capturing unit position display UI 602 are selected, those symbols are all filled with a specific color. In addition, the symbols displayed on the image capturing unit position display UI 602 indicate a positional relationship among the first to fourth pan drive units 114 to 144, and the shooting direction (direction of the shooting view angle) of each of the first to fourth image capturing units 110 to 140 is different. For this reason, in a case where a plurality of image capturing units are selected, it is preferably set that the image capturing unit position display UI 602 does not look emphasized from the user by being grayed out to be displayed (represented by being hatched in FIG. 20) or being hidden, or the like. According to this, the user can concentrate on the operation while viewing the image in the image display region 600, and it is possible to avoid occurrence of an erroneous operation.

In addition, in a case where a plurality of image capturing units are selected, the image capturing unit position display UI 602 is similarly grayed out to be displayed and preferably set to have a disabled operation setting in which an operation by the user is not accepted.

Fourth Embodiment

According to the first embodiment and the second embodiment, the description has been described with an example of the camera 100 that is a multi-lens camera including a plurality of image capturing units, but according to a fourth embodiment, the case of a single lens camera including a single image capturing unit will be described.

Figure 21:
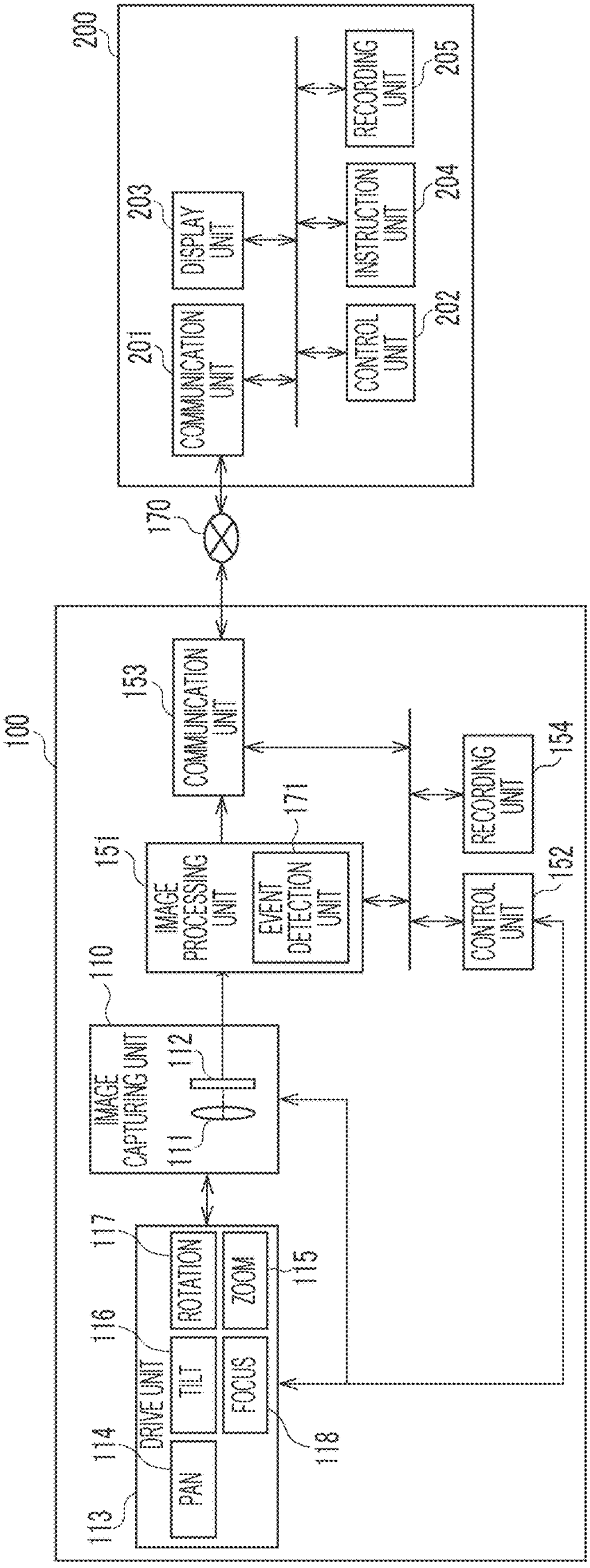
FIG. 21 illustrates a functional configuration example of the image capturing system of a fourth embodiment.

FIG. 21 illustrates a functional configuration example of the image capturing system according to the fourth embodiment in which the camera 100 including a single image capturing unit and a drive unit and the client apparatus 200 are connected via the network 170. In FIG. 21, the first image capturing unit 110 and the first drive unit 113 that have been described above are exemplified as the single image capturing unit and the drive unit. According to the fourth embodiment, those components will be described as the image capturing unit 110 and the drive unit 113. As in the present embodiment, in a case where the camera 100 includes only the single image capturing unit 110, unlike the above-described embodiments, since the pan drive unit and the roll drive unit do not necessarily need to be separated, the drive units are integrated as the pan drive unit 114 in the drive unit 113. It is noted that except that the camera 100 includes the single image capturing unit 110 and the drive unit 113, the configuration is generally similar to the above-described configuration of FIG. 1, and the description of those similar configurations will be omitted.

Figure 22:
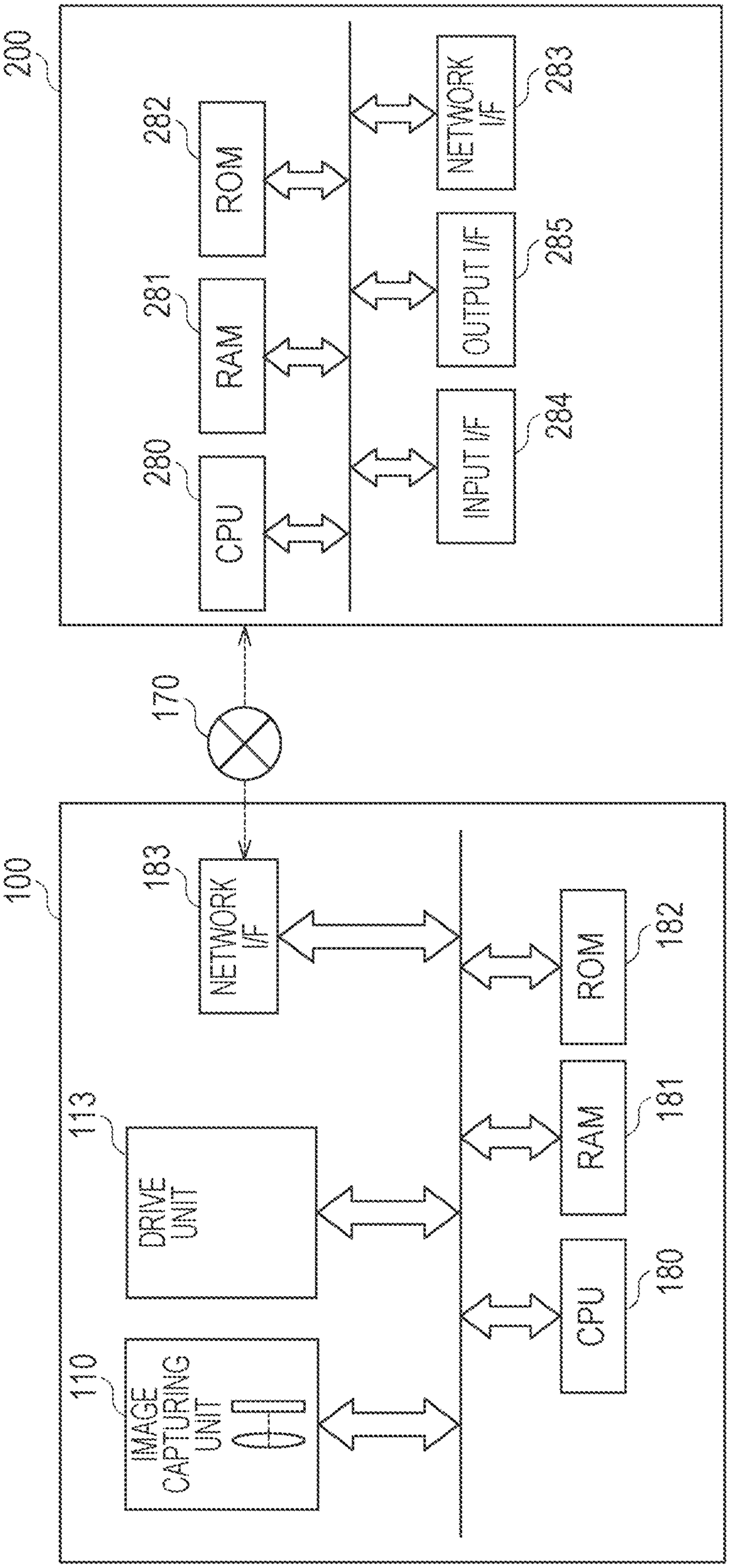
FIG. 22 illustrates a hardware configuration example of the image capturing system of the fourth embodiment.

FIG. 22 illustrates a hardware configuration of the image capturing system of the fourth embodiment. In the case of FIG. 22, as being different from FIG. 7 described above, the camera 100 includes the single image capturing unit 110 and the drive unit 113. In FIG. 22 too, the configuration is generally similar to the above-described configuration of FIG. 7 except that the camera 100 has the single image capturing unit 110 and the drive unit 113, and the description of those similar configurations will be omitted.

Figure 23A:
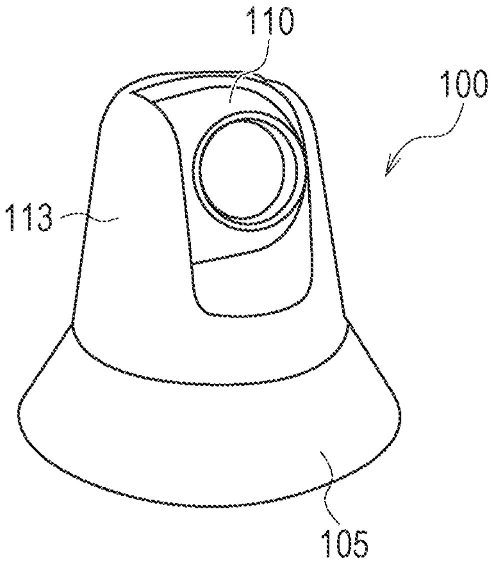
FIGS. 23A and 23B illustrate external appearance configuration examples of an image capturing device of the fourth embodiment.
Figure 23B:
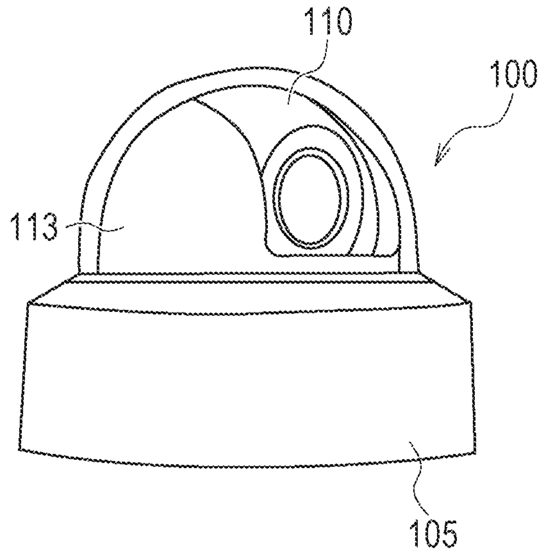

FIGS. 23A and 23B illustrate schematic external appearance configuration examples of the camera 100 according to the fourth embodiment. The camera 100 of the fourth embodiment is a single-lens camera including the single image capturing unit 110 as being different from the multi-lens camera illustrated in the first embodiment. FIG. 23A and FIG. 23B illustrate examples of two types of the cameras 100 each having a different design. Each of the cameras 100 in FIG. 23A and FIG. 23B is installed on a wall, a ceiling, or the like with the fixed section 105, and the image capturing unit 110 is driven in the pan and tilt directions by the drive unit 113.

Similarly as in the above-described embodiments, also in the case of the camera 100 like the fourth embodiment that includes the single image capturing unit 110 and the drive unit 113, the user can intuitively perform the change instruction (operation) of the shooting direction while viewing the display image without being conscious about the rotation angle. It is noted that in a case where the image capturing unit 110 has one single-lens camera configuration as in the camera 100 of the present embodiment, the image capturing unit selection UI 604 of the GUI 500 described above is not needed.

Fifth Embodiment

According to a fifth embodiment, a case will be described where the tilt angle is within a predetermined threshold angle range in particular. According to the present embodiment, for example, the description will be provided while the predetermined threshold angle range in the tilt angle is set as +90 degrees (+90 degrees with respect to the horizontal direction) as an example. The camera 100 of the fifth embodiment includes the first to fourth image capturing units 110 to 140 and the first to fourth drive units 113 to 143, and functional configurations and hardware configurations of the camera 100 and the client apparatus 200 are similar to those of the first to third embodiments. Therefore, the description of those will be omitted. According to the fifth embodiment too, similarly as described above, the first image capturing unit 110 and the first drive unit 113 will be described as representative examples.

Figure 24A:
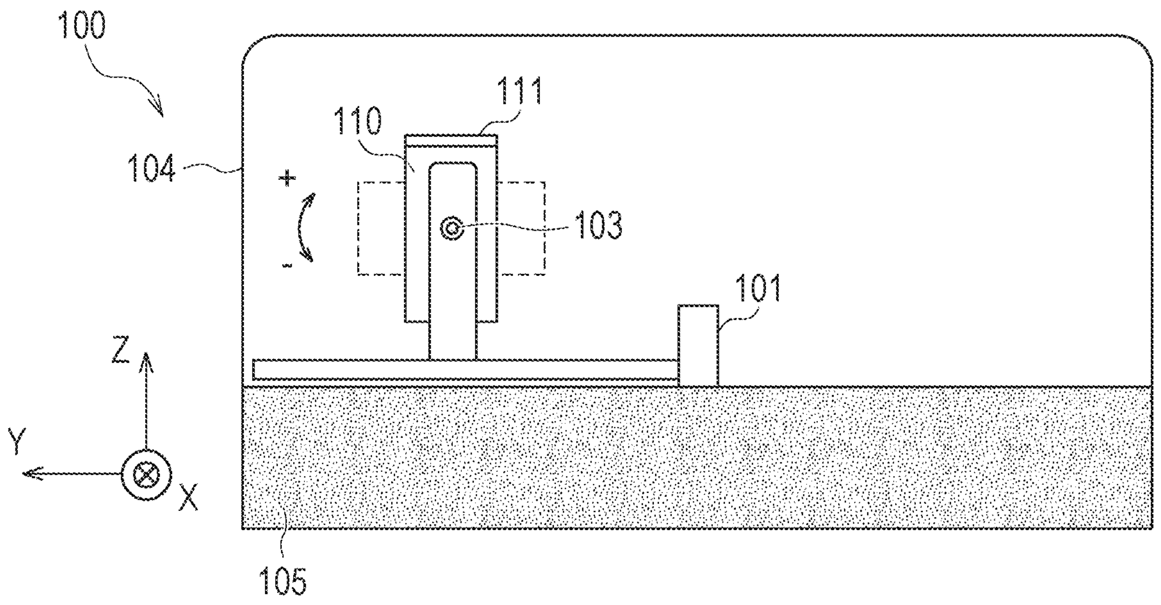
FIGS. 24A and 24B are explanatory diagrams for describing the rotation drive when a tilt angle is +90 degrees.

FIG. 24A illustrates a situation where it looks as if the first image capturing unit 110 rotates in a case where the first image capturing unit 110 is panned to be driven by the first pan drive unit 114 in a state in which the tilt angle of the first tilt drive unit 116 is +90 degrees. FIG. 24A is a diagram is similar to FIG. 3 described above but as being different from the example of FIG. 3, the tilt angle of the first image capturing unit 110 is +90 degrees. It is noted that FIG. 24A also depicts the lens of the first imaging optical system 111 to make it easier to indicate the shooting direction of the first image capturing unit 110.

Figure 24B:
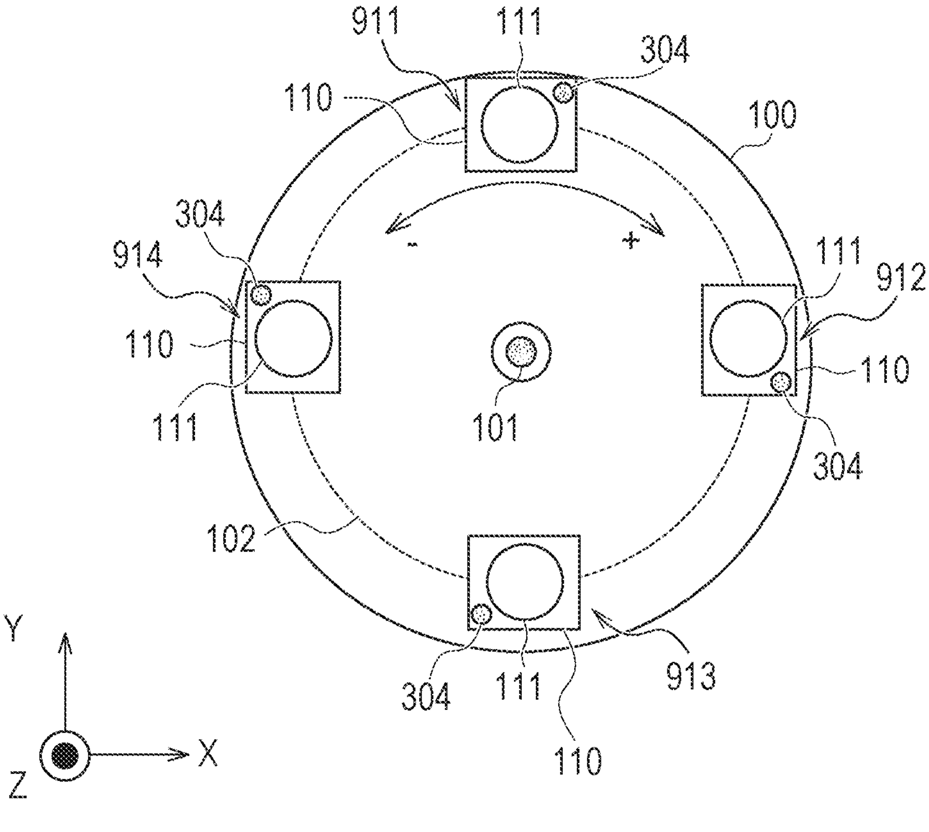

FIG. 24B illustrates an example of each position of the first image capturing unit 110 in a case where the first image capturing unit 110 is moved on the circumference 102 by the first pan drive unit 114. FIG. 24B is a schematic diagram that is similar to FIG. 2 but focuses only on the first image capturing unit 110 in a case where the pan drive is performed by the first pan drive unit 114 in particular, and illustrations of the second to fourth image capturing units 120 to 140 except for the first image capturing unit 110 are omitted. That is, FIG. 24B illustrates the first image capturing unit 110 in each of positions 911 to 914 when the first image capturing unit 110 is moved by the first pan drive unit 114 on the circumference 102 by 90 degrees each. It is assumed that the position 911 illustrated in FIG. 24B indicates a position of the first image capturing unit 110 in an initial position (0 degrees) at the time of the pan drive by the first pan drive unit 114. The position 912 in FIG. 24B indicates a position after the pan drive of the first image capturing unit 110 from the initial position by +90 degrees, and similarly in the following, the position 913 indicates a position after the pan drive from the initial position by +180 degrees, and the position 914 indicates a position after the pan drive from the initial position by +270 degrees.

In addition, in FIG. 24B, to clearly represent that it looks as if the first image capturing unit 110 rotates when moving on the circumference 102 by the first pan drive unit 114, a mark 304 is drawn in a fixed position on the top right when viewed from the front of the first image capturing unit 110. Herein, in a case where the mark 304 of the first image capturing unit 110 is viewed from a captured object side (forefront side on paper), when the first image capturing unit 110 is panned to be driven in the + direction, it may be found out that it looks as if the mark 304 rotates about the first image capturing unit 110 clockwise. In this case, it looks as if the object viewed from the first image capturing unit 110 rotates in a direction similar to that described with reference to FIGS. 9A and 9B (in the + direction of the first rotation drive unit 117), in other words, rotates clockwise. In view of the above, in a case where the tilt angle of the first image capturing unit 110 is +90 degrees, it is preferably set that the pan drive by the first pan drive unit 114 is not to be performed. In other words, in a case where the tilt angle of the first image capturing unit 110 is +90 degrees, with the setting that the first pan drive unit 114 is not to be driven, it is possible to avoid capture of an image in a state in which an unnecessary rotation has occurred. Alternatively, in a case where the tilt angle of the first image capturing unit 110 is +90 degrees, the first rotation drive unit 117 may be rotated to be driven in a rotation direction for cancelling the rotation apparently caused by the pan drive by the first image capturing unit 110.

In addition, in a case where the tilt angle of the first image capturing unit 110 is in the state of being +90 degrees, even when the user wishes to move the shooting direction of the first image capturing unit 110 in the horizontal direction, it is expected that the user does not understand how to operate. Then, in this case, it is expected that the user attempts to operate the first tilt drive unit 116 so as to set the tilt angle of the first image capturing unit 110 in the 0-degree direction. However, since the pan/tilt buttons 701 to 708 of the GUI 500 described above are not buttons for directly designating and driving the first tilt drive unit 116, it is expected that the user does not understand how to end a state in which the tilt angle is +90 degrees.

In view of the above, in the case of the fifth embodiment, to notify the user of a method of ending the state in which the tilt angle is +90 degrees, a direction in which the tilt angle becomes 0 degrees is displayed in the GUI 500.

Figure 25:
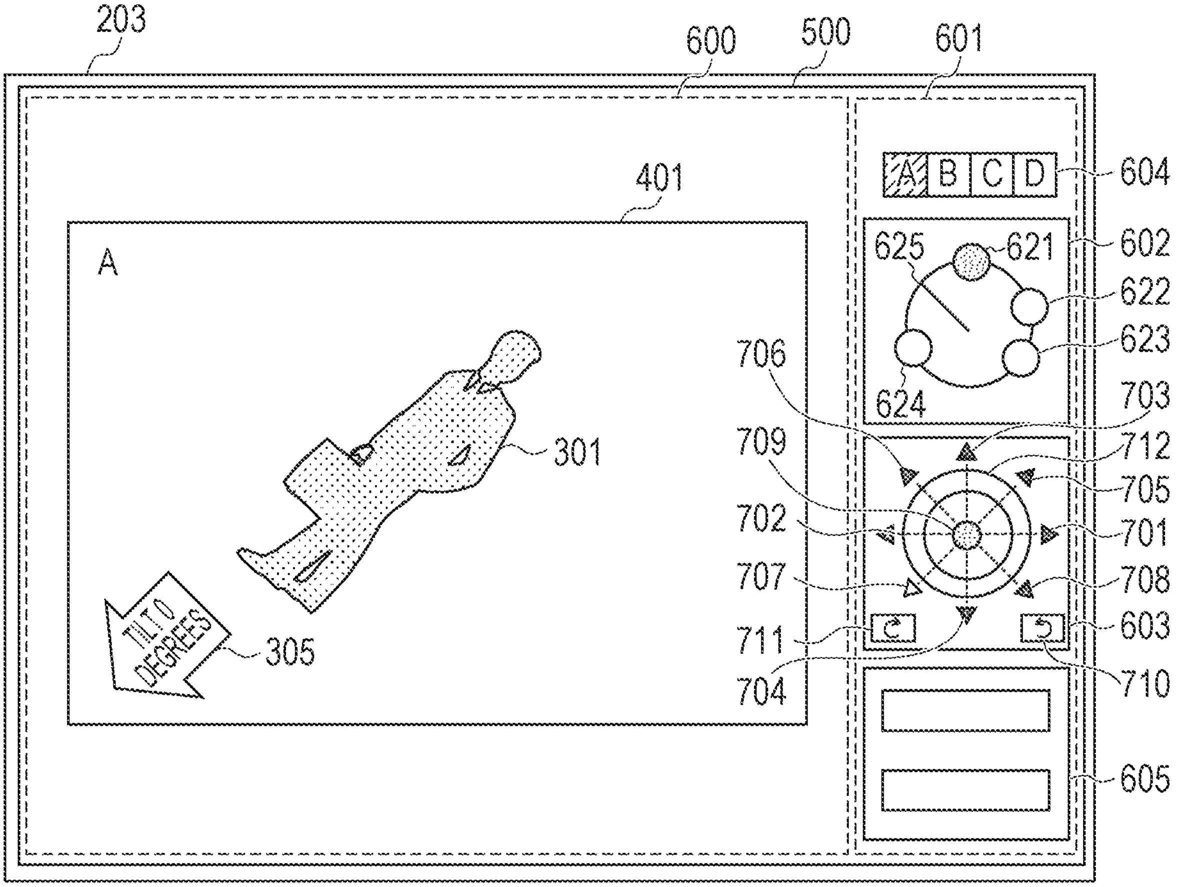
FIG. 25 illustrates a GUI example when the tilt angle is +90 degrees.

FIG. 25 illustrates an example of the GUI 500 on which an arrow 305 indicating a direction for setting the tilt angle to 0 degrees in a case where, for example, the tilt angle of the first image capturing unit 110 is +90 degrees is displayed. In this case, for example, the pan/tilt button that is not to be operated by the user grayed out to be displayed (or filled with a specific color) to indicate that the pan/tilt button is not operable or the pan/tilt button itself is hidden, so that only the operable drive direction may be explicitly indicated for the user. In this manner, in a case where the tilt angle of the image capturing unit is +90 degrees, by changing the display of the GUI 500 in accordance with the drivable direction, the user can perform the intuitive operation.

According to the fifth embodiment, when the tilt angle is +90 degrees, the unnecessary rotation of the image can be avoided through a setting that the pan drive unit is not to be driven, but instead of the pan drive unit, a setting may be made that the rotation drive unit is not to be driven. In this case, on the GUI 500, instead of graying out or hiding the pan/tilt button, the rotation buttons 710 and 711 may be grayed out to be displayed or hidden.

According to the fifth embodiment, the tilt angle at +90 degrees has been exemplified as the threshold angle range, but the threshold angle range is not limited to +90 degrees. For example, a range of the tilt angle from +80 degrees to +100 degrees may be set to be within the threshold angle range. It is noted that the threshold angle range may be further expanded from the range from +80 degrees to +100 degrees, but a maximum angle range in a case where the threshold angle range is expanded is an angle range from +45 degrees to +135 degrees. This is because in a case where the tilt angle is less than or equal to +45 degrees, the image capturing unit captures an image in the horizontal direction, and the pan drive by the pan drive unit looks like a movement instead of a rotation.

In addition, according to the present embodiment, a movable range of the tilt drive unit is set as a range from 0 degrees to +90 degrees but is not limited to this, and a change can be appropriately made. In addition, the present embodiment is also similarly applied to a case where the tilt angle is −90 degrees.

In addition, according to the fifth embodiment, the description has been provided using the example of the image capturing device having a plurality of image capturing units like the first to third embodiments, but the embodiment can also be similarly applied to an image capturing device including only a single image capturing unit as described in the fourth embodiment.

It is noted that as illustrated in FIG. 24B, the first image capturing unit 110 moves on the circumference 102 by the pan drive of the first pan drive unit 114. Strictly speaking, respective positions of the first image capturing unit 110 that has sequentially moved on the circumference 102 are different positions from each other. For this reason, strictly speaking, the shooting ranges of the first image capturing unit 110 in the respective positions also move. On the other hand, as a distance between the position of the first image capturing unit 110 and the shaft 101 of the circumference 102 is shorter, it looks more likely as if the first image capturing unit 110 is rotating instead of moving. For example, in the case of the single-lens camera including only one image capturing unit, it is not necessary to include a rotatable shaft that is common to a plurality of image capturing units like a multi-lens camera. Since the rotatable shaft and the position of the image capturing unit is closer, it looks more likely as if the image capturing unit is rotating. In addition, for example, as the imaging optical system of the image capturing unit has a wider angle, an influence from the distance between the image capturing unit and the rotatable shaft on the view angle is smaller, and in this case too, it looks more likely as if the image capturing unit is rotating.

OTHER EMBODIMENTS

The present disclosure can also be realized by processing in which a program for realizing one or more functions of the above-described embodiments is supplied to a system or an apparatus via a network or a storage medium, and one or more processors in a computer of the system or the apparatus reads out and executes the program. In addition, the present disclosure can be realized by a circuit (for example, an application specific integrated circuit (ASIC)) configured to realize one or more functions.

Any of each of the embodiments described above is merely an illustration of an implementation example for carrying out the present disclosure, and a technical scope of the present disclosure is not to be interpreted in a restrictive manner by these. That is, the present disclosure can be implemented in various forms without departing from its technical concept or its main characteristics.

Embodiment(s) of the present disclosure can also be realized by a computer of a system or apparatus that reads out and executes computer executable instructions (e.g., one or more programs) recorded on a storage medium (that may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-038131 filed Mar. 12, 2024, which is hereby incorporated by reference herein in its entirety.

What is claimed is:

1. A control apparatus comprising:

one or more memories storing instructions; and one or more processors executing the instructions to:

obtain a movement direction instructed by a user with respect to an image captured to be displayed by an image capturing unit;

obtain at least one of a rotation angle by a rotation of the image capturing unit or an image capturing element of the image capturing unit about an optical axis of an imaging optical system or a rotation angle by a rotation of the displayed image about a center of the image; and control a first drive unit configured to move a shooting direction of the image capturing unit in a first direction and a second drive unit configured to move the shooting direction of the image capturing unit in a second direction that is different from the first direction, wherein a movement of the shooting direction of the image capturing unit by the first drive unit and the second drive unit is controlled based on the rotation angle in a manner that the shooting direction of the image capturing unit matches the movement direction instructed by the user, wherein the image capturing unit includes a plurality of image capturing units, and the first drive unit includes a plurality of first drive units configured to individually move the shooting direction for each of the plurality of image capturing units in the first direction, wherein the second drive unit includes a plurality of second drive units configured to individually move the shooting direction for each of the plurality of image capturing units in the second direction, wherein the control apparatus further comprises a plurality of rotation units configured to individually rotate each of the image capturing units or the image capturing element of each of the image capturing units about the optical axis of the imaging optical system, wherein the movement direction instructed by the user with respect to the image captured to be displayed by one or more image capturing units selected by the user from among the plurality of image capturing units is obtained, wherein the plurality of first drive units, the plurality of second drive units, and the plurality of rotation units are controlled, wherein the movement direction includes a plurality of movement directions, wherein the one or more processors execute the instructions to generate data of a user interface for the user to instruct the plurality of movement directions, and wherein in a case where multiple image capturing units are selected by the user from among the plurality of image capturing units, a state indicating that an operation by the user on the user interface is disabled is displayed or the user interface is hidden.

2. The control apparatus according to claim 1, wherein a rotation unit configured to rotate the image capturing unit or the image capturing element of the image capturing unit about the optical axis of the imaging optical system is controlled.

3. The control apparatus according to claim 1, wherein the one or more processors execute the instructions to perform image processing of rotating the image captured by the image capturing unit about the center of the image.

4. The control apparatus according to claim 1, wherein the rotation angle is calculated based on the rotation of the image capturing unit or the image capturing element of the image capturing unit about the optical axis of the imaging optical system and the rotation of the image captured to be displayed by the image capturing unit about the center of the image.

5. The control apparatus according to claim 1, wherein the one or more processors execute the instructions to generate data of the user interface for the user to instruct the movement direction with respect to the image captured to be displayed by the image capturing unit or data of a user interface indicating a movement direction of an object depicted in the image.

6. The control apparatus according to claim 5, wherein the user interface for the user to instruct the movement direction with respect to the image captured to be displayed by the image capturing unit and the user interface indicating the movement direction of the object depicted in the image are user interfaces indicating opposite directions.

7. The control apparatus according to claim 1, wherein a composite vector of the first direction by the first drive unit and the second direction by the second drive unit is calculated based on the rotation angle, and wherein a ratio of drives by the first drive unit and the second drive unit is determined based on the composite vector.

8. The control apparatus according to claim 7, wherein drive amounts of the first drive unit and the second drive unit are determined based on the composite vector.

9. The control apparatus according to claim 1, wherein the first direction is a direction in which the shooting direction of the image capturing unit is moved in a horizontal direction, wherein the second direction is a direction in which the shooting direction of the image capturing unit is moved in a vertical direction, and wherein in a case where the shooting direction of the image capturing unit that is moved in the second direction is within a predetermined angle range with respect to the horizontal direction, the first drive unit or the rotation unit is not driven.

10. The control apparatus according to claim 9, wherein the movement direction includes a plurality of movement directions, and the one or more processors execute the instructions to generate data of the user interface for the user to instruct the plurality of movement directions, and wherein in a case where the first drive unit or the rotation unit is not driven, a state indicating that an operation by the user on the user interface is disabled is displayed or the user interface is hidden.

11. The control apparatus according to claim 9, wherein in a case where the shooting direction of the image capturing unit that is moved in the second direction is within the predetermined angle range with respect to the horizontal direction, the one or more processors execute the instructions to generate data of a user interface indicating a direction in which the shooting direction of the image capturing unit turns to the horizontal direction.

12. The control apparatus according to claim 1, wherein the one or more processors execute the instructions to perform a mirror inversion of the image captured by the image capturing unit, and wherein in a case where the mirror inversion is performed, movement directions of the shooting direction by the first drive unit and the second drive unit are inverted.

13. A method by a control apparatus, the method comprising:

obtaining a movement direction instructed by a user with respect to an image captured to be displayed by an image capturing unit;

obtaining at least one of a rotation angle by a rotation of the image capturing unit or an image capturing element of the image capturing unit about an optical axis of an imaging optical system or a rotation angle by a rotation of the displayed image about a center of the image; and controlling a first drive unit configured to move a shooting direction of the image capturing unit in a first direction and a second drive unit configured to move the shooting direction of the image capturing unit in a second direction that is different from the first direction, wherein a movement of the shooting direction of the image capturing unit by the first drive unit and the second drive unit is controlled based on the rotation angle in a manner that the shooting direction of the image capturing unit matches the movement direction instructed by the user, wherein the image capturing unit includes a plurality of image capturing units, and the first drive unit includes a plurality of first drive units configured to individually move the shooting direction for each of the plurality of image capturing units in the first direction, wherein the second drive unit includes a plurality of second drive units configured to individually move the shooting direction for each of the plurality of image capturing units in the second direction, wherein the control apparatus further comprises a plurality of rotation units configured to individually rotate each of the image capturing units or the image capturing element of each of the image capturing units about the optical axis of the imaging optical system, wherein the movement direction instructed by the user with respect to the image captured to be displayed by one or more image capturing units selected by the user from among the plurality of image capturing units is obtained, wherein the plurality of first drive units, the plurality of second drive units, and the plurality of rotation units are controlled, wherein the movement direction includes a plurality of movement directions, wherein the one or more processors execute the instructions to generate data of a user interface for the user to instruct the plurality of movement directions, and wherein in a case where multiple image capturing units are selected by the user from among the plurality of image capturing units, a state indicating that an operation by the user on the user interface is disabled is displayed or the user interface is hidden.

14. A non-transitory computer readable storage medium storing a program for causing a computer to execute a method, the method comprising:

obtaining a movement direction instructed by a user with respect to an image captured to be displayed by an image capturing unit;

obtaining at least one of a rotation angle by a rotation of the image capturing unit or an image capturing element of the image capturing unit about an optical axis of an imaging optical system or a rotation angle by a rotation of the displayed image about a center of the image; and controlling a first drive unit configured to move a shooting direction of the image capturing unit in a first direction and a second drive unit configured to move the shooting direction of the image capturing unit in a second direction that is different from the first direction, wherein a movement of the shooting direction of the image capturing unit by the first drive unit and the second drive unit is controlled based on the rotation angle in a manner that the shooting direction of the image capturing unit matches the movement direction instructed by the user, wherein the image capturing unit includes a plurality of image capturing units, and the first drive unit includes a plurality of first drive units configured to individually move the shooting direction for each of the plurality of image capturing units in the first direction, wherein the second drive unit includes a plurality of second drive units configured to individually move the shooting direction for each of the plurality of image capturing units in the second direction, wherein the control apparatus further comprises a plurality of rotation units configured to individually rotate each of the image capturing units or the image capturing element of each of the image capturing units about the optical axis of the imaging optical system, wherein the movement direction instructed by the user with respect to the image captured to be displayed by one or more image capturing units selected by the user from among the plurality of image capturing units is obtained, wherein the plurality of first drive units, the plurality of second drive units, and the plurality of rotation units are controlled, wherein the movement direction includes a plurality of movement directions, wherein the one or more processors execute the instructions to generate data of a user interface for the user to instruct the plurality of movement directions, and wherein in a case where multiple image capturing units are selected by the user from among the plurality of image capturing units, a state indicating that an operation by the user on the user interface is disabled is displayed or the user interface is hidden.

* * * * *